(12) United States Patent
Broughton et al.

(10) Patent No.: US 9,304,342 B2
(45) Date of Patent: Apr. 5, 2016

(54) DISPLAY DEVICE

(75) Inventors: Benjamin John Broughton, Oxford (GB); Allan Evans, Oxford (GB); Paul Antony Gass, Oxford (GB); Graham Roger Jones, Oxford (GB); Andrew Kay, Oxford (GB); Harry Garth Walton, Oxford (GB); Takashi Yasumoto, Osaka (JP); Yoshimitsu Inamori, Osaka (JP); Kenji Maeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 625 days.

(21) Appl. No.: 12/678,587

(22) PCT Filed: Oct. 2, 2008

(86) PCT No.: PCT/JP2008/068324
§ 371 (c)(1),
(2), (4) Date: Mar. 17, 2010

(87) PCT Pub. No.: WO2009/110128
PCT Pub. Date: Sep. 11, 2009

(65) Prior Publication Data
US 2010/0214324 A1    Aug. 26, 2010

(30) Foreign Application Priority Data
Mar. 4, 2008 (GB) .................................. 0804022.2

(51) Int. Cl.
*G09G 5/10* (2006.01)
*G09G 3/28* (2013.01)
(Continued)

(52) U.S. Cl.
CPC .............. *G02F 1/1323* (2013.01); *G09G 3/003* (2013.01); *G09G 3/3648* (2013.01); *G09G 2320/028* (2013.01); *G09G 2320/0285* (2013.01); *G09G 2320/068* (2013.01)

(58) Field of Classification Search
USPC .................................................. 345/204, 690
See application file for complete search history.

(56) References Cited

U.S. PATENT DOCUMENTS

RE27,617 E    4/1973  Olsen
4,764,410 A   8/1988  Grzywinski
(Continued)

FOREIGN PATENT DOCUMENTS

GB    2 413 394 A    10/2005
GB    2 414 848 A    12/2005
(Continued)

OTHER PUBLICATIONS

International Search Report for corresponding Application No. PCT/JP2008/068324 mailed Feb. 10, 2009.
(Continued)

*Primary Examiner* — Kumar Patel
*Assistant Examiner* — Afroza Chowdhury
(74) *Attorney, Agent, or Firm* — Renner, Otto, Boisselle & Sklar, LLP

(57) ABSTRACT

A display device is provided that comprises a liquid crystal display panel (2) for displaying an image by spatial light modulation. The image is represented by a plurality of image elements each having an image data value (7). The display device further comprises a display controller (1) arranged to determine a signal voltage to be applied to the panel (2) for each image element in dependence upon its image data value (7) and a secondary data value (8) for the element, there being a predetermined mapping between the data values and the signal voltage. The secondary data values (8) are arranged to vary across the image so as to introduce variations in luminance as a result of the mapping. The mapping and secondary data values (8) are mutually arranged to take account of the signal voltage to on-axis luminance response of the panel (2) so that the luminance variations introduced on-axis tend to balance locally through spatial averaging to, and hence would not be perceivable by, an on-axis viewer (3). The panel (2) furthermore has a non-linear off-axis luminance to on-axis luminance relationship, so that at least some of the luminance variations introduced off-axis do not balance locally through spatial averaging to, and hence would be perceivable by, an off-axis viewer (4).

41 Claims, 16 Drawing Sheets

(51) Int. Cl.
  *G02F 1/13* (2006.01)
  *G09G 3/00* (2006.01)
  *G09G 3/36* (2006.01)

(56) References Cited

U.S. PATENT DOCUMENTS

| | | | |
|---|---|---|---|
| 4,766,023 | A | 8/1988 | Lu |
| 5,147,716 | A | 9/1992 | Bellus |
| 5,528,319 | A | 6/1996 | Austin |
| 5,831,698 | A | 11/1998 | Depp et al. |
| 5,877,829 | A | 3/1999 | Okamoto et al. |
| 6,211,930 | B1 | 4/2001 | Sautter et al. |
| 7,965,268 | B2 * | 6/2011 | Gass et al. ............ 345/87 |
| 8,368,727 | B2 * | 2/2013 | Smith ............ G02B 27/2214 345/690 |
| 2007/0040780 | A1 * | 2/2007 | Gass et al. ............ 345/87 |
| 2007/0075950 | A1 | 4/2007 | Yamada et al. |
| 2008/0088935 | A1 | 4/2008 | Daly |
| 2010/0156774 | A1 * | 6/2010 | Broughton et al. ...... 345/88 |
| 2011/0012924 | A1 | 1/2011 | Gass et al. |
| 2011/0175936 | A1 * | 7/2011 | Smith et al. ............ 345/690 |
| 2011/0261093 | A1 * | 10/2011 | Broughton et al. ...... 345/694 |
| 2012/0056914 | A1 | 3/2012 | Gass et al. |
| 2012/0169790 | A1 * | 7/2012 | Broughton ............ G06F 21/84 345/690 |

FOREIGN PATENT DOCUMENTS

| | | |
|---|---|---|
| GB | 2 428 101 A | 1/2007 |
| GB | 2 428 152 A | 1/2007 |
| GB | 2 439 961 A | 1/2008 |
| GB | 2 445 982 A | 7/2008 |
| GB | 2 455 061 A | 6/2009 |
| JP | 2007-017988 A | 1/2007 |
| WO | 2006/132384 A1 | 12/2006 |

OTHER PUBLICATIONS

Form PCT/ISA/237.
British Search Report for corresponding Application No. GB0804022.2 dated Jun. 12, 2008.
Y. Yamada et al., "Fast Response and Wide-Viewing Angle Technologies for LC-TV Application", ASV, IDW'02 Digest, pp. 203-206.
K. Hanaoka et al., "A New MVA-LCD by Polymer Sustained Alignment Technology", PSA, SID '04 Digest, pp. 1200-1203.
Ernst Leuder, "Liquid Crystal Displays", Wiley and Sons, Ltd., 2001, pp. 237-239.

* cited by examiner

FIG. 2

CONVENTIONAL ART

| Main Image Data Value | | Output Voltage |
|---|---|---|
| 0 | → | x.xx V |
| 1 | → | x.xx V |
| 2 | → | x.xx V |
| 3 | → | x.xx V |
| 4 | → | x.xx V |
| 5 | → | x.xx V |
| 6 | → | x.xx V |
| 7 | → | x.xx V |
| 8 | → | x.xx V |
| 9 | → | x.xx V |
| 10 | → | x.xx V |
| 11 | → | x.xx V |
| 12 | → | x.xx V |
| 13 | → | x.xx V |
| 14 | → | x.xx V |
| 15 | → | x.xx V |
| 16 | → | x.xx V |
| 17 | → | x.xx V |
| 18 | → | x.xx V |
| 19 | → | x.xx V |
| 20 | → | x.xx V |
| ... | → | x.xx V |

F I G. 4

| Main Image Data Value | Private Mode On/Off | Side Image Data Value | Spatial Parameter | | Output Voltage |
|---|---|---|---|---|---|
| 0 | 1 | 1 | 1 | → | x.xx V |
| 0 | 1 | 0 | 1 | → | x.xx V |
| 0 | 1 | 1 | 0 | → | x.xx V |
| 0 | 1 | 0 | 0 | → | x.xx V |
| 0 | 0 | | | → | x.xx V |
| 1 | 1 | 1 | 1 | → | x.xx V |
| 1 | 1 | 0 | 1 | → | x.xx V |
| 1 | 1 | 1 | 0 | → | x.xx V |
| 1 | 1 | 0 | 0 | → | x.xx V |
| 1 | 0 | | | → | x.xx V |
| 2 | 1 | 1 | 1 | → | x.xx V |
| 2 | 1 | 0 | 1 | → | x.xx V |
| 2 | 1 | 1 | 0 | → | x.xx V |
| 2 | 1 | 0 | 0 | → | x.xx V |
| 2 | 0 | | | → | x.xx V |
| 3 | 1 | 1 | 1 | → | x.xx V |
| 3 | 1 | 0 | 1 | → | x.xx V |
| 3 | 1 | 1 | 0 | → | x.xx V |
| 3 | 1 | 0 | 0 | → | x.xx V |
| 3 | 0 | | | → | x.xx V |
| 4 | 1 | 1 | 1 | → | x.xx V |
| ... | ... | ... | ... | → | x.xx V |

F I G. 6
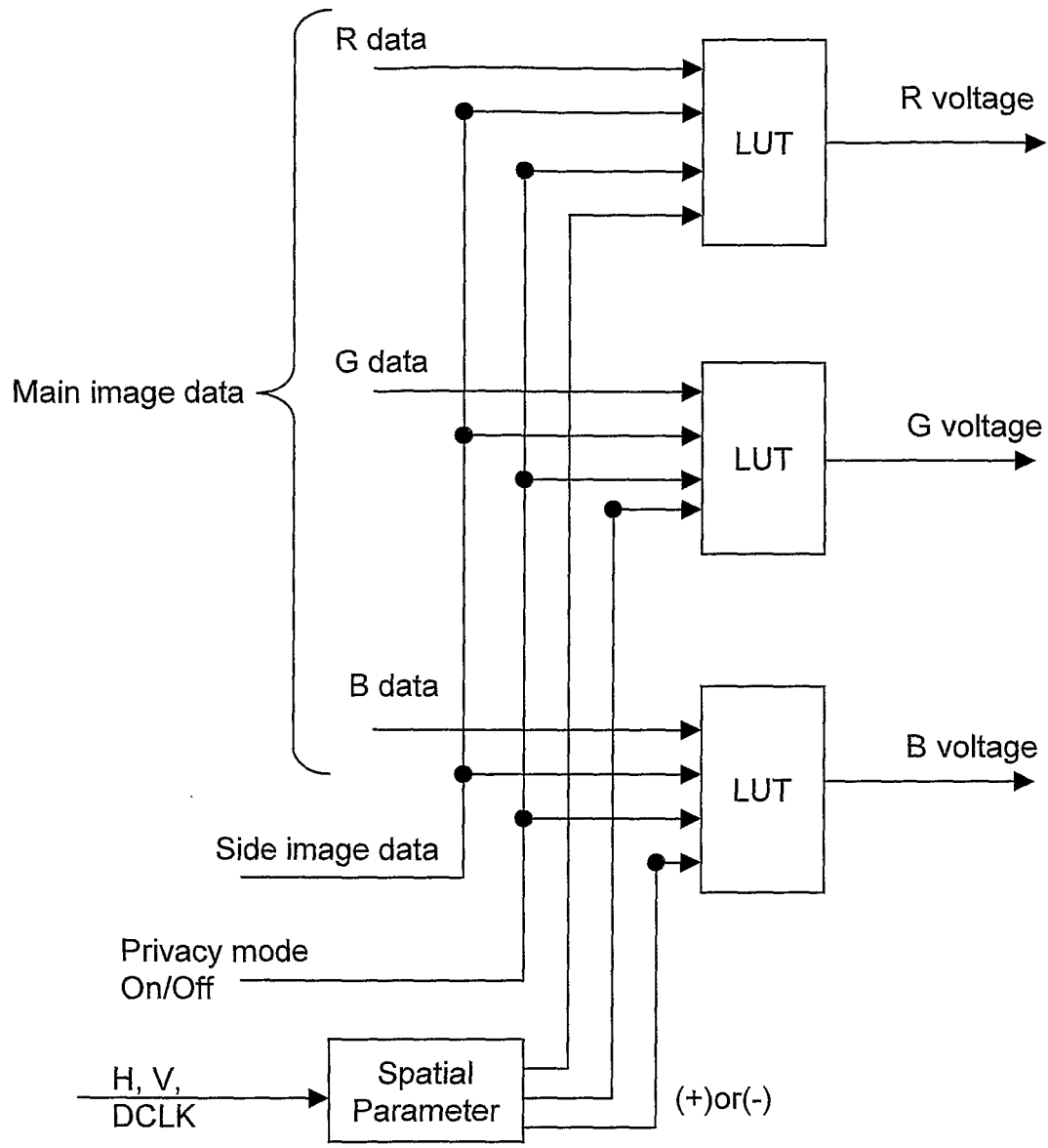

DISPLAY DEVICE

TECHNICAL FIELD

The present invention relates to a display device, such as an active matrix liquid crystal display device, which is switchable between a public and private display mode.

BACKGROUND ART

In a first, public, mode of a display device that is switchable between a public and private display mode, the device commonly behaves as a standard display. A single image is displayed by the device to as wide a viewing angle range as possible, with optimum brightness, image contrast and resolution for all viewers. In the second, private mode, the main image is discernible only from within a reduced range of viewing angles, usually centred on the normal to the display surface. Viewers regarding the display from outside this reduced angular range will perceive either a second, masking image which obscures the main image, or a main image so degraded as to render it unintelligible.

This concept can be applied to many devices where a user may benefit from the option of a privacy function on their normally wide-view display, for use in certain public situations where privacy is desirable. Examples of such devices include mobile phones, Personal Digital Assistants (PDAs), laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

Several methods exist for adding a light controlling apparatus to a naturally wide-viewing range display.

One such structure for controlling the direction of light is a 'louvred' film. The film consists of alternating transparent and opaque layers in an arrangement similar to a Venetian blind. Like a Venetian blind, it allows light to pass through it when the light is travelling in a direction nearly parallel to the layers, but absorbs light travelling at large angles to the plane of the layers. These layers may be perpendicular to the surface of the film or at some other angle. Methods for the production of such films are described in a USRE27617 (F. O. Olsen; 3M 1973), U.S. Pat. No. 4,766,023 (S.-L. Lu, 3M 1988), and U.S. Pat. No. 4,764,410 (R. F. Grzywinski; 3M 1988).

Other methods exist for making films with similar properties to the louvred film. These are described, for example, in U.S. Pat. No. 5,147,716 (P. A. Bellus; 3M 1992), and U.S. Pat. No. 5,528,319 (R. R. Austin; Photran Corp. 1996).

Louvre films may be placed either in front of a display panel or between a transmissive display and its backlight to restrict the range of angles from which the display can be viewed. In other words, they make a display "private".

The principal limitation of such films is that they require mechanical manipulation, i.e. removal of the film, to change the display between the public and private viewing modes.

A method for switching from public to private mode with no moving parts is to mount a light control film behind the display panel, and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect.

Switchable privacy devices of these types are described in U.S. Pat. No. 5,831,698 (S. W. Depp; IBM 1998), U.S. Pat. No. 6,211,930 (W. Sautter; NCR Corp. 2001) and U.S. Pat. No. 5,877,829 (M. Okamoto; Sharp K. K. 2001). They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public than in private mode, unless the backlight is made brighter to compensate.

Another disadvantage relates to the power consumption of these devices. In the public mode of operation, the diffuser is switched off. This often means that voltage is applied to a switchable polymer-dispersed liquid crystal diffuser. More power is therefore consumed in the public mode than in the private mode. This is a disadvantage for displays which are used for most of the time in the public mode.

In GB2413394 (Sharp), a switchable privacy device is constructed by adding one or more extra liquid crystal layers and polarisers to a display panel. The intrinsic viewing angle dependence of these extra elements can be changed by switching the liquid crystal electrically in the well-known way. Devices utilising this technology include the Sharp Sh851i and Sh902i mobile phones.

WO06132384A1 (Sharp, 2005) discloses the use of an extra liquid crystal layer located between the existing polarisers of a liquid crystal display (LCD) panel. In this location, the extra switch cell can modify the greyscale curves for off axis light. This provides a higher level of privacy for images than the techniques disclosed in GB2413394.

GB2439961 (Sharp) discloses the use of a switchable privacy device constructed by adding an extra cholesteric layer and circular polarisers to a display panel. The cholesteric layer can be switched between a public (wide view) mode and a private (narrow view) mode that can provide 360° azimuthal privacy.

The above methods all suffer the disadvantage that they require the addition of extra apparatus to the display to provide the functionality of electrically switching the viewing angle range. This adds cost, and particularly bulk to the display, which is very undesirable, particularly in mobile display applications such as mobile phones and laptop computers.

Methods to control the viewing angle properties of an LCD by switching the single liquid crystal layer of the display between two different configurations, both of which are capable of displaying a high quality image to the on-axis viewer are described in US20070040780A1 and GB 0721255.8. These devices provide the switchable privacy function without the need for added display thickness, but require complex pixel electrode designs and other manufacturing modifications to a standard display.

One example of a display device with privacy mode capability with no added display hardware complexity is the Sharp Sh702iS mobile phone. This uses a manipulation of the image data displayed on the phone's LCD, in conjunction with the angular data-luminance properties inherent to the liquid crystal mode used in the display, to produce a private mode in which the displayed information is unintelligible to viewers observing the display from an off-centre position. However, the quality of the image displayed to the legitimate, on-axis viewer in the private mode is severely degraded.

A similar scheme to that used on the Sh702iS phone, but which manipulates the image data in a manner dependent on a second, masking, image, and therefore causes that masking image to be perceived by the off-axis viewer when the modified image is displayed, is given in GB2428152A1. However, the image processing methods described in the above document rely on the data-value to luminance curve being strongly non-linear for off-axis viewing directions, which is not the case for modern LC display modes such as "Advanced Super View" (ASV) (IDW'02 Digest, pp 203-206) or Polymer Stabilised Alignment (PSA) (SID'04 Digest, pp 1200-1203). As a result, the privacy effect is not sufficiently strong in these displays in some circumstances to disguise the main image.

It is therefore desirable to provide a high quality LCD display which has public and private mode capability, in which no modification to the LC layer or pixel electrode geometry is required from a standard display, has a substantially unaltered display performance (brightness, contrast resolution etc) in the public mode, and in the private mode has a strong privacy effect with minimal degradation to the on-axis image quality.

DISCLOSURE OF THE INVENTION

According to a first aspect of the present invention there is provided a display device comprising a liquid crystal display panel for displaying an image by spatial light modulation. The image is represented by a plurality of image elements each having an image data value. The display device further comprises a display controller arranged to determine a signal voltage to be applied to the panel for each image element in dependence upon its image data value and a secondary data value for the element, there being a predetermined mapping between the data values and the signal voltage. The secondary data values are arranged to vary across the image so as to introduce variations in luminance as a result of the mapping. The mapping and secondary data values are mutually arranged to take account of the signal voltage to on-axis luminance response of the panel so that the luminance variations introduced on-axis tend to balance locally through spatial averaging to, and hence would not be perceivable by, an on-axis viewer. The panel furthermore has a non-linear off-axis luminance to on-axis luminance relationship, so that at least some of the luminance variations introduced off-axis do not balance locally through spatial averaging to, and hence would be perceivable by, an off-axis viewer.

The mapping and secondary data values may be mutually arranged such that, for each of a plurality of groups of image elements perceived by a viewer as having a single luminance through spatial averaging, any increase in luminance introduced by the secondary data value or values of one subset of elements in the group is substantially matched by a substantially equal decrease in luminance introduced by the secondary data value or values of another subset of elements in the group, at least where the respective image data values of the elements in the subsets are equal.

At least some of the groups may comprise a pair of image elements, the secondary data value for one of the image elements of the pair being arranged to introduce an increase in luminance of an amount, and the secondary data value for the other image element of the pair may be arranged to introduce a decrease in luminance by substantially the same amount, at least where the respective image data values of the two image elements of the pair are equal.

The luminance change introduced by the secondary data value may be determined such that either the resulting luminance of one of the image elements of the pair is close to a maximum luminance or the resulting luminance of the other image element of the pair is close to a minimum luminance.

The on-axis luminance response of the display panel may be non-linear with respect to variations in the image data value.

Each secondary value may comprise a side data value and a spatial data value, the spatial data value controlling at least in part whether a luminance increase or decrease is introduced by the secondary data value and the side data value controlling at least in part an amount of the luminance increase or decrease.

The side data values may together form a distracting side image that is perceived by the off-axis viewer.

The original image may to some extent be hidden in the image perceived by the off-axis viewer, preferably substantially hidden, so as to provide a privacy effect off-axis. In this respect, the image perceived by the off-axis viewer may be different to the original image by the introduction of at least some degree of visually confusing information, preferably a high degree of visually confusing information.

The display device may comprise means to reduce the resolution of the side image, so as to introduce localised blocks having side data values of equal value.

The mapping may incorporate a conversion of the image and side data values to equivalent respective luminance values in dependence upon a property of the display panel.

The property may comprise a gamma value $\gamma$ associated with the display panel, and wherein the equivalent luminance value $M_{Lum}$ of an image data value $M_{in}$ is calculated as $M_{Lum}=M_{in}^{\gamma}$ and the equivalent luminance value $S_{Lum}$ of a side data value $S_{in}$ is calculated as $S_{Lum}=S_{in}^{\gamma}$, with each of $M_{Lum}$, $M_{in}$, $S_{Lum}$ and $S_{in}$ being represented on a scale from 0 to 1.

The mapping may incorporate a transformation of the equivalent luminance value for the image data value.

The transformation may be asymmetric.

The transformation may comprise a scaling and translation of the form $M_{cmp}=\beta \cdot M_{Lum}+\delta$ where $\beta$ and $\delta$ are predetermined respective scaling and translation parameters, $M_{Lum}$ is the equivalent luminance value for the image data value and $M_{cmp}$ is the scaled and translated value for the image data value, with $M_{Lum}$ and $M_{cmp}$ being represented on a scale from 0 to 1.

$\beta$ may be a value between 0.35 and 0.55. $\delta$ may be a value between 0.02 and 0.08.

$\beta$ may be a value between 0.42 and 0.5. $\delta$ may be a value between 0.03 and 0.07.

The transformation may be dependent upon the side data value.

Different values for $\beta$ and $\delta$ may be used depending on the side data value.

The off-axis to on-axis relationship may have a first section which is more non-linear than a second section, and a first subset of the image elements may be transformed in a first manner so that the transformed luminance range has a first degree of overlap with the first section, and a second subset of the image elements may be transformed in a second manner, different to the first manner, so that the transformed luminance range has a second degree of overlap with the first section, the first degree of overlap being larger than the second degree of overlap.

$\beta$ may be replaced by $x \cdot \beta$, where x takes a first value for those image data values of the first subset, and a second value, different from the first value, for those image data values of the second subset.

The first value may be lower than the second value, such as 0.1 and 1 for the first and second values respectively.

The mapping may incorporate a transformation of the equivalent luminance value for the side data value.

The transformation may be of the form $S_{cmp}=S_{Lum}\times(0.5-|M_{cmp}-0.5|)$, where $S_{Lum}$ is the equivalent luminance value for the side data value and $S_{cmp}$ is the transformed equivalent luminance value for the side data value, with $S_{Lum}$ and $S_{cmp}$ being represented on a scale from 0 to 1.

A minimum value greater than zero may be specified for the transformed equivalent luminance value for the side data value.

The display device may comprise circuitry for adding or subtracting a multiple of the transformed equivalent luminance value for the side data value to/from the transformed equivalent luminance value for the image data value, the choice between addition and subtraction being made in dependence upon the spatial data value.

The multiple may be 1.

Different multiples may be used for different subsets of image elements.

The display device may comprise circuitry for subtracting a first multiple of the transformed equivalent luminance value for the side data value for a first subset of image elements, and adding a second multiple of the transformed equivalent luminance value for the side data value for a second subset of image elements, the number of image elements in the second subset being N times that in the first subset, and the first multiple being N times the second multiple.

The off-axis to on-axis relationship may have a first section which is more non-linear than a second section, and wherein the amount of luminance change introduced by the secondary data value is determined so as to be greater where the equivalent luminance value for an image data value lies in the second section than where the equivalent luminance value lies in the first section.

The display device may comprise circuitry for determining the spatial data value from spatial information relating to the image element.

The spatial information may comprise horizontal and vertical image coordinates associated with the image element.

Fewer side data values may be provided than there are image data values, with at least one side data value being used for a plurality of different image data values.

Fewer spatial data values may be provided than there are image data values, with at least one spatial data value being used for a plurality of different image data values.

Fewer secondary data values may be provided than there are image data values, with at least one secondary data value being used for a plurality of different image data values.

The display device may comprise circuitry for filtering the image, as represented by the image data values, to add an amount of blur preferentially to any higher frequency image features such as lines.

The display controller may comprise mapping circuitry having respective inputs for receiving the image data value and the secondary data value for an image element of the plurality, circuitry for looking up a stored value in dependence upon the input data values, and an output for outputting the stored value, the signal voltage for the image element being determined in dependence upon the output value.

The output value may be used as the signal voltage.

The display panel may comprise a plurality of pixels each having a plurality of colour components, and wherein each image element is associated with an individual such colour component.

The image elements of the pair may relate respectively to the same colour component of different pixels.

The image elements of the pair may be from horizontally or vertically adjacent pixels.

Different conversions may be used respectively for at least two colour components, based on different respective properties of the display panel associated with those components.

The first subset may comprise image elements from different respective pixels, each image element of the first subset being associated with a different colour component.

The display device may comprise means for increasing the non-linearity of the off-axis luminance to on-axis luminance relationship.

It will be appreciated that exact local balancing of the luminance variations introduced on-axis by the secondary data values is not required for satisfactory operation of an embodiment of the present invention, it merely being required that the luminance variations have a tendency to balance or cancel each other out locally. For example, the device may operate such that exact luminance balancing is only achieved in a localised region where the image data values are uniform in that region, since the amount of luminance change introduced by the secondary data values may depend upon the image data values themselves. Certainly, the changes introduced in an embodiment of the present invention are luminance-based rather than data value-based, the mapping taking account of the signal voltage to on-axis luminance response of the panel to achieve this luminance balancing for the secondary data values being input to the mapping.

According to a second aspect of the present invention there is provided a display device comprising a liquid crystal display panel for displaying an image by spatial light modulation. The image is represented by a plurality of image elements each having an image data value. The display device further comprises a display controller arranged to determine a signal voltage to be applied to the panel for each image element in dependence upon its image data value and a secondary data value for the element, there being a predetermined mapping between the data values and the signal voltage. The display controller comprises mapping circuitry having respective inputs for receiving the image data value and the secondary data value for an image element of the plurality, circuitry for looking up a stored value in dependence upon the input data values, and an output for outputting the stored value. The signal voltage for the image element is determined in dependence upon the output value. The output value may be used directly as the signal voltage.

An embodiment of the present invention provides a liquid crystal display with switchable privacy function. In the public mode, the display operates in a substantially unaltered manner from a standard LCD, in that for each frame of the video displayed, data constituting a single image is supplied to the display control electronics, the control electronics then output a series of signal voltages and timing signals to the active-matrix array of the display, and these voltages reorient the liquid crystal director within each pixel in such a way that the required amount of light is transmitted by each pixel through the display polarisers to cause the image to be displayed.

In the private mode, the display controller outputs signal voltages which are dependent on two input images, the main image for observation by the legitimate viewer on-axis, and a side image which may be chosen either to obscure the main image for off-axis viewers or degrade the main image when viewed off axis. It should be noted that the display controller still outputs the same quantity of signal voltage information (a voltage for each pixel in the display) as in the public mode. It is simply that those output voltages are now dependent on the image data values of two, rather than one, input images.

The result of the output signal voltages is that the main image is still perceived by the on-axis viewer while, due to the data value to luminance response of the display differing on and off axis, the side image is seen by the off-axis viewer, substantially obscuring or degrading the main image and thereby rendering it private.

An embodiment of the present invention disclosed herein constitutes an LCD display with control electronics modified from the standard in order to allow it to output signal voltages which are dependent on one image in the public mode and two images in the private mode. It also constitutes specific relationships between the output signal voltages and the two input images which result in the main image being observed by the on-axis viewer with image quality as close as possible to that as would be observed if the main image were displayed in the public mode, and the side image simultaneously being observed by the off-axis viewer with optimal obscuring or degrading effect on the main image.

The implementation of the image processing method in GB2428152A1 (mentioned previously) is described as an extra step in the display control electronics process, resulting in the generation of a "combined image" dataset which is then input to a standard display driver. The present applicant has appreciated that this is not necessary, and the extra step can be eliminated simply by incorporating an expanded version of the existing look-up table, and increased frame buffer to store the side image also, in the control electronics. No active processing of the images therefore need take place in the display electronics.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2: is an example of a standard LCD controller data value to output voltage mapping (look-up table).

FIG. 4: is an example of the expanded look-up table required for operation of a device according to a preferred embodiment.

FIG. 6: is a schematic illustrating how a portion of the control electronics of a preferred embodiment may be implemented in an electronic circuit.

BEST MODE FOR CARRYING OUT THE INVENTION

In a preferred embodiment, the display consists of a standard LCD display, with modified control electronics. An LCD display generally consists of several component parts including:

1. A backlighting unit to supply even, wide angle illumination to the panel.

Figure 1:
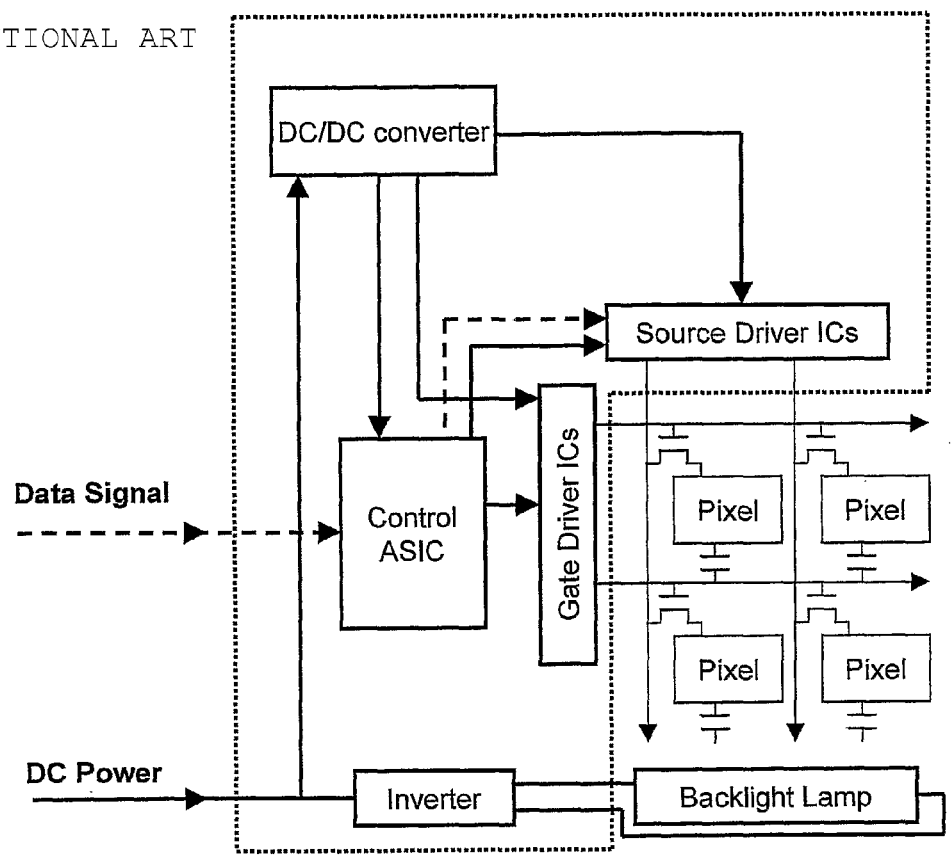
FIG. 1: is an example schematic of a standard LCD display panel and associated control electronics.

2. Control electronics to receive digital image data and output analogue signal voltages for each pixel, as well as timing pulses and a common voltage for the counter electrode of all pixels. A schematic of the standard layout of an LCD control electronics is shown in FIG. 1 (Ernst Lueder, Liquid Crystal Displays, Wiley and sons Ltd, 2001).

3. An LC panel, for displaying an image by spatial light modulation, consisting of a two opposing glass substrates, onto one of which is disposed an array of pixel electrodes and active matrix array to direct the electronic signals, received from the control electronics, to the pixel electrodes. Onto the other substrate is usually disposed a uniform common electrode and colour filter array film. Between the glass substrates is contained a liquid crystal layer of given thickness, usually 2-6 μm, which may be aligned by the presence of an alignment layer on the inner surfaces of the glass substrates. The glass substrates will generally be placed between crossed polarising films and other optical compensation films to cause the electrically induced alignment changes within each pixel region of the LC layer to produce the desired optical modulation of light from the backlight unit and ambient surroundings, and thereby generate the image.

Figure 3:
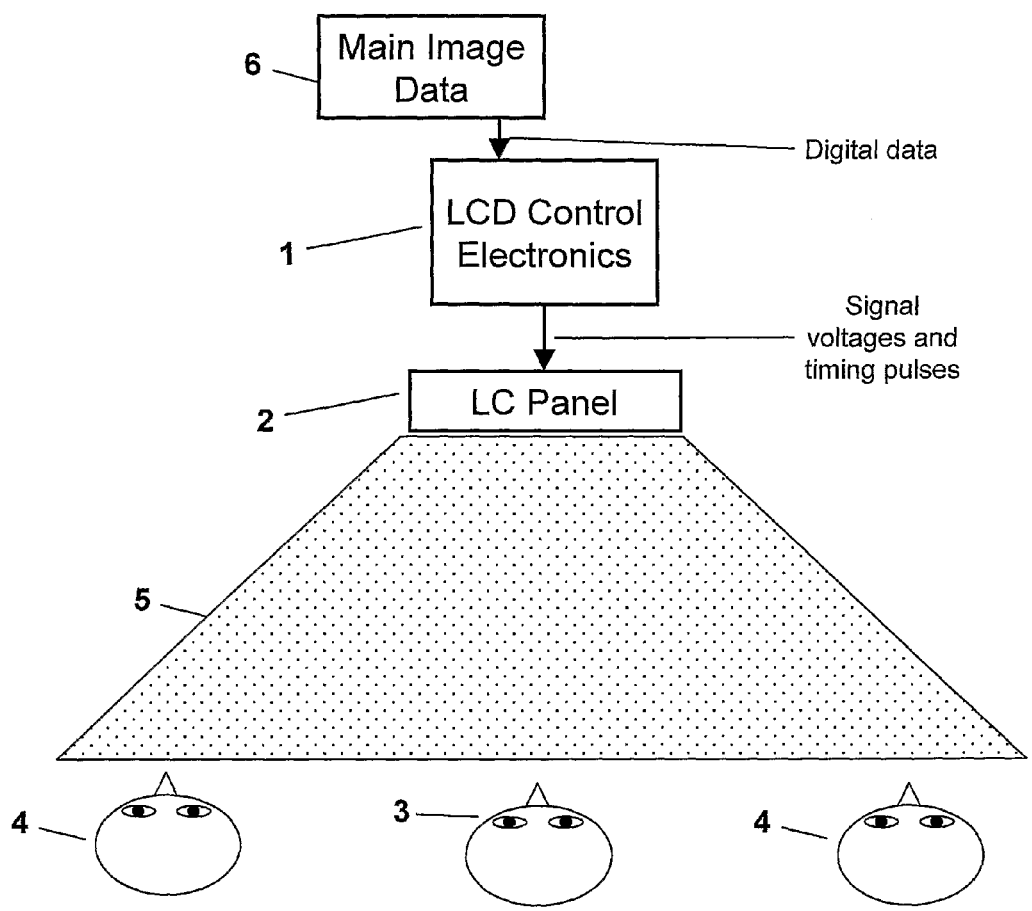
FIG. 3: is a schematic of a display according to an embodiment of the present invention operating in the public mode.

An embodiment of the present invention is represented schematically in FIG. 3, operating in a public display mode. Generally the LCD Control Electronics (referred to herein also as control electronics), 1, will be configured specifically to the electro-optical characteristics of the LC panel, 2, so as to output signal voltages which are dependent on the input image data in such a way as to optimise the perceived quality of the displayed image, i.e. resolution, contrast, brightness, response time etc, for the principal viewer, 3, observing from a direction normal to the display surface (on-axis). The relationship between the input image data value for a given pixel and the observed luminance resulting from the display (gamma curve) is determined by the combined effect of the data-value to signal voltage mapping of the display driver, and the signal voltage to luminance response of the LC panel.

The LC panel, 2, will generally be configured with multiple LC domains per pixel and/or passive optical compensation films so as to preserve the display gamma curve as closely as possible to the on-axis response for all viewing angles, thereby providing substantially the same high quality image to a wide viewing region, 5. However, it is an inherent property of liquid crystal displays that their electro-optic response is angularly dependent and the off-axis gamma curve will inevitably differ from the on-axis one. As long as this does not result in contrast inversion or large colour-shift or contrast reduction, this does not generally result in an obvious perceived fault in the observed image for the off-axis viewer, 4.

When the device of this embodiment is operating in the public mode, a set of main image data, 6, constituting a single image, is input to the control electronics, 1, in each frame period. The control electronics then outputs a set of signal data voltages to the LC panel, 2. Each of these signal voltages is directed by the active matrix array of the LC panel to the corresponding pixel electrode and the resulting collective electro-optical response of the pixels in the LC layer generates the image.

The control electronics has a single mapping of input pixel data value to output pixel data voltage (Look-up table), a known example of which is given in FIG. 2, which it applies to the process for all pixels. In some cases a different look-up table may be used for the red, green and blue sub-pixels of the display, but there is no variation in the mapping of input data to output voltage based on the spatial position of the pixel data within the image, or the pixel electrode within the display. Substantially the same image is then perceived by the on-axis viewer, 3, and off-axis viewers, 4, and the display can be said to be operating in a wide viewing mode. This situation is illustrated in FIG. 3, and can be said to be the standard method of operation for an LCD.

Figure 5:
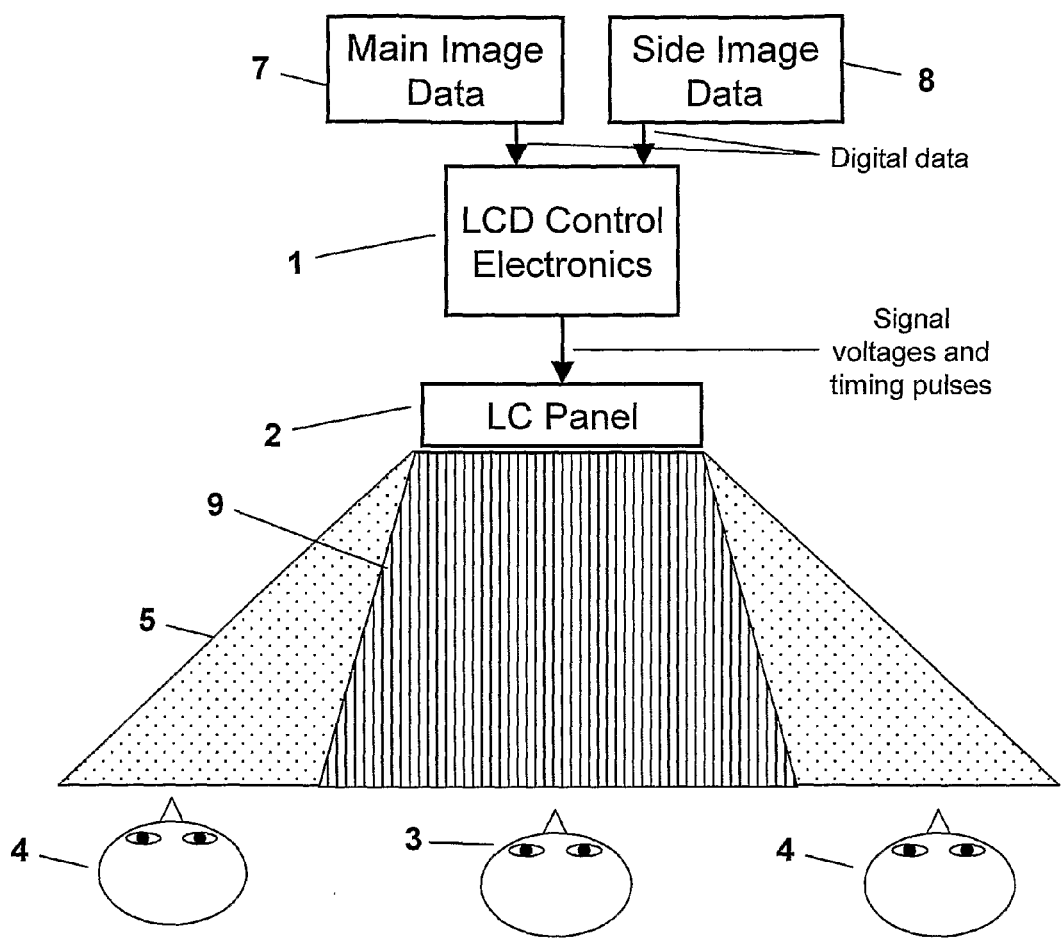
FIG. 5: is a schematic of a display according to an embodiment of the present invention operating in the private mode.

As is illustrated schematically in FIG. 5, when the device is operating in the private mode, two image datasets are input to the control electronics, 1, in every frame period: main image data, 7, constituting a main image, and side image data, 8, constituting a side image.

The control electronics then outputs a set of signal data voltages, one data voltage for each pixel in the LC panel as previously. However, the control electronics (display controller) now utilises an expanded look-up table (LUT) and the output signal data voltage for each pixel in the LC panel, constituting a combined image, is dependent on the data values for the corresponding pixel (in terms of spatial position in the image) in both the main, 7, and side, 8, images. The output data voltage for each pixel may also be dependent on a third parameter determined by the spatial position of the pixel within the display. An example of such an expanded LUT is given in FIG. 4.

In this way, the standard LCD control electronics are modified to receive, and store in a buffer, two, rather than one, images per frame period, and also to map the data values of two input images to a single output voltage per pixel, possibly also taking into account a third, spatially dependent, parameter into this mapping. In this case the mapping of input image data to output pixel voltage is no longer identical for all pixels, or even all sub-pixels of the same colour component, in the display.

The third, spatially dependent, parameter may be a "flag" value indicating which of two or more groups the pixel is deemed to be in based on its spatial position. For example, pixels in odd numbered columns in the image array may be said to form one group and pixels in even columns another. The groups could also constitute odd and even pixel rows, or perhaps the two parts of a chequerboard arrangement of the pixel array, etc.

The output voltage from the control electronics, 1, then causes the LC panel, 2, to display a combined image which is the main image when observed by the main viewer, 3, with minimal degradation of the main image quality. However, due to the different gamma curve characteristic of the LC panel for the off-axis viewers, 4, these off-axis observers perceive the side image most prominently, which obscures and/or degrades the main image, securing the main image information to viewers within a restricted cone of angles centred on the display normal, 9. This situation is illustrated in FIG. 5.

The main image 7 can be considered to be represented by a plurality of image elements, each having an image data value. The control electronics are arranged to determine the signal voltage to be applied to the panel for each image element in dependence not only upon its image data value, from the main image 7, but also upon a secondary data value associated with the element. The secondary data value can be considered to comprise a spatially-corresponding data value from the side image 8 (side data values) together with a spatially-corresponding one of the third parameters mentioned above (spatial data values).

The look-up table defines a predetermined mapping between the data values (image and secondary) and the signal voltage. The secondary data values are arranged to vary across the image so as to introduce variations in luminance as a result of the mapping, both on and off axis.

The mapping and secondary data values are mutually arranged to take account of the signal voltage to on-axis luminance response of the panel so that the luminance variations introduced on-axis tend to balance locally through spatial averaging to an on-axis viewer. Hence the on-axis luminance variations tend not to be perceivable, by the on-axis viewer.

On the other hand, with the panel having a non-linear off-axis luminance to on-axis luminance relationship, at least some of the luminance variations introduced off-axis do not balance locally through spatial averaging to an off-axis viewer, and would hence be perceivable by the off-axis viewer.

While the spatial data value controls, at least in part, whether a luminance increase or decrease is introduced by the secondary data value, the side data value controls, at least in part, the amount of the luminance increase or decrease. It can be considered that the side data values together form a distracting side image that is perceived by the off-axis viewer.

For a group of image elements that perceived by a viewer as having a single luminance through spatial averaging, any increase in luminance introduced by the secondary data value or values of one subset of elements in the group is arranged to be matched by a substantially equal decrease in luminance introduced by the secondary data value or values of another subset of elements in the group (this is the case, at least, where the respective image data values of the elements in the subsets are equal).

For example, such a group may comprise just a pair of image elements, in which case the secondary data value for one of the image elements of the pair is arranged to introduce, through the mapping, an increase in luminance of a certain amount, while the secondary data value for the other image element of the pair is arranged, through the mapping, to introduce a decrease in luminance of substantially the same amount (again, at least where the respective image data values of the two image elements of the pair are equal).

It may be arranged that fewer secondary data values (either or both of side and spatial data values) are provided than there are image data values, with at least one secondary data value being used for a plurality of different image data values.

It should be noted that, where the display panel comprises a plurality of pixels each having a plurality of colour components, the term "image element" as used herein may be interpreted as referring to an individual such colour component. Furthermore, different processing may be applied respectively for at least two colour components, based on different respective properties of the display panel associated with those components.

The format of the expanded look-up table required for operation of the device in the manner described is shown in FIG. 4. As can be seen, an output voltage is supplied for all combinations of main image pixel data value, side image pixel data value, privacy mode on/off, and the spatial group value. The whole of the look-up table is not shown, as the main image will typically have 8 bit data, so 256 possible values, for each of which there are five possible combinations of the above parameters (if privacy mode is off, there is no need to refer to the side image and spatial parameter values). An example of a conventional LUT is shown for comparison in FIG. 2. It should be noted that the embodiment is not limited to 1 bit data for the side image, and that main and side images of any colour bit-depth can be accommodated by the device; increasing the colour-bit depth will simply require an increase in the amount of memory required.

An example circuit diagram illustrating how the added functionality provided by the expanded LUT of FIG. 4 may be implemented in the display controller electronics is shown in FIG. 6. FIG. 6 shows mapping circuitry having respective inputs for receiving the main image data values and the secondary data values (side image data values and spatial data values), circuitry (LUT) for looking up a stored value in dependence upon the input data values, and an output for outputting the stored value (R voltage, G voltage, B voltage), the signal voltage for the image element being determined in dependence upon the output value (in FIG. 6 the signal voltage is equal to the output value, though this need not be so). The circuit shows the control electronics for a single white pixel, with red, green and blue sub-pixels. It should be noted that although this diagram assumes monochromatic side image data, and therefore the input value to the R, G and B sub-pixels is the same, this is not necessarily the case. Also, it can be seen from FIG. 6 that the separation of the pixels into groups according to the spatial parameter in these examples is done by means of an output from the spatial parameter controller to each sub-pixel LUT. This allows dynamic reconfiguration of the spatial groupings which may be advantageous, either to reverse the polarity of the groupings in sequential time frames, or to alter the spatial arrangement of the groupings in the image for different applications. It is also the case that if the patterning of spatial groupings in the image is required to be fixed, only a single spatial parameter output would be required and the selection of groupings could be hardwired into the control electronics by means of the presence or not of an inverter on the input of the spatial parameter data line into each sub-pixel's LUT.

Figure 7:
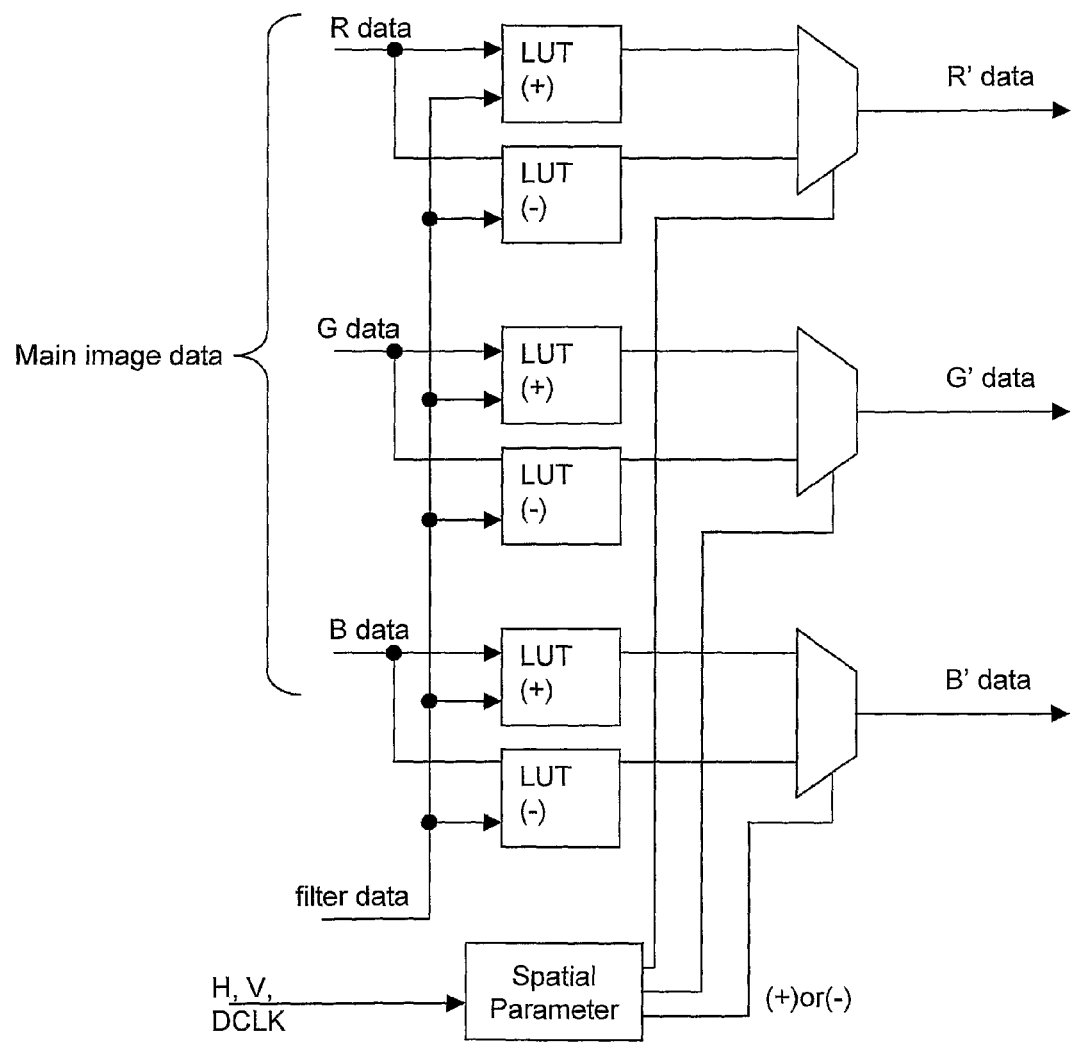
FIG. 7: is a further schematic illustrating how a portion of the control electronics of a preferred embodiment may alternatively be implemented in an electronic circuit.

FIG. 7 illustrates a further example of a potential implementation of the modified control electronics of the device. This arrangement is a simplified equivalent of the more general circuit in FIG. 6, for the special case in which the mapping of input data to output voltage is the same in the public mode and in the private mode when the side image data value is 0. The public mode image is therefore equivalent to a private mode image with a uniform side image of data value 0 pixels, and the need for a separate Private Mode On/Off input is removed.

The examples shown in FIG. 6 and FIG. 7 both include circuitry for determining the spatial data value from spatial information relating to the image element, where in these examples the spatial information comprises horizontal and vertical image coordinates associated with the image element, represented by the horizontal and vertical signals H and V respectively. The DCLK signal shown in FIGS. 6 and 7 is a timing signal.

Having described the modifications to the standard display control electronics of an LCD which are required to provide the switchable privacy function, it remains to describe examples of the relationships between input data and output voltage stored in the said modified control electronics which produce the desired privacy effect (although it will be appreciated that the above hardware modifications will apply equally where other input data to output voltage relationships are employed).

Aforementioned patent application GB2428152A1 describes using an image processing device to modify the image data values of an input image, according to the corresponding pixel data values of a secondary image, in order to produce a privacy effect. In that disclosure, the relationship between the input and output image data values is described as follows:

The main image is compressed by some factor β, and centred about the mid-point data value of the range. E.g. if the main image has data values form 0 to 255, input values $M_{in}(x,y,c)$ are transformed to output values $M_{cmp}(x,y,c)$ by the relation $$\frac{M_{cmp}(x, y, c)}{255} = \beta\left(\frac{M_{in}(x, y, c)}{255}\right) + \frac{1-\beta}{2},$$

where x and y are the spatial co-ordinates of each pixel in the image array, and c is the colour component (R,G or B) of the pixel. The secondary image $S_{in}(x,y,c)$ is then compressed by a factor $(1-\beta)/2$, i.e. to provide a compressed secondary image $$S_{cmp}(x, y, c) = \left(\frac{1-\beta}{2}\right)S_{in}(x, y, c).$$

The two images are then combined by alternately adding and subtracting the compressed secondary image data value to/from the compressed main image data value for successive pixels. E.g. pixel data values in odd columns of the combined image array have output data values $C(x=odd,y,c)=M_{cmp}(x=odd,y,c)+S_{cmp}(x=odd,y,c)$, and pixels in even columns of the image have output data values $C(x=even,y,c)=M_{cmp}(x=odd,y,c)-S_{cmp}(x=odd,y,c)$.

Figure 8:
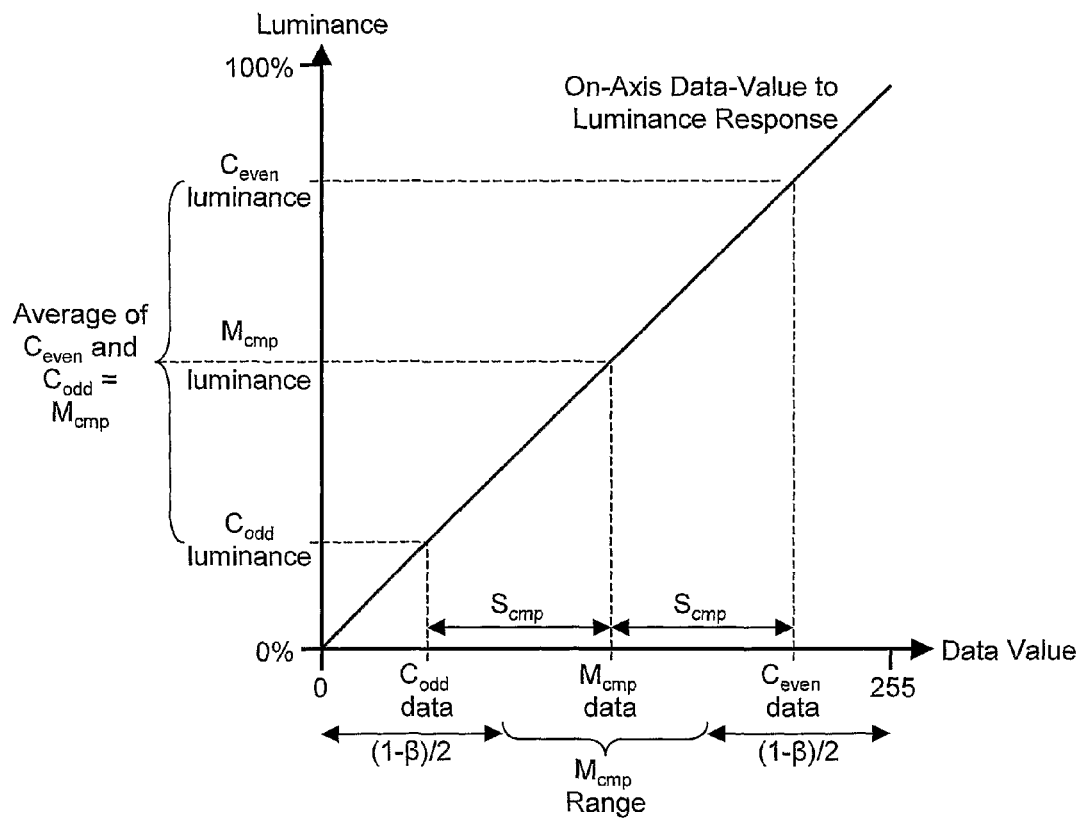
FIG. 8: is a graph illustrating the on-axis data value to luminance response and method of operation of a device in the prior art.

If the data-value to luminance response of the display is substantially linear for the on-axis viewer, then the average luminance value of neighbouring pixels in the image, e.g. C(x,y,c) and C(x+1,y,c), will be equal to the average luminance of the same pair of pixels in the compressed main image, with data value $M_{cmp}$. If the solid angle subtended by the area of the pixels in the display from the observer's eye is sufficiently small, then the eye will perceive this averaged pixel value, and the on-axis viewer will perceive the displayed image to be substantially the compressed main image. This situation is illustrated in FIG. 8.

Figure 9:
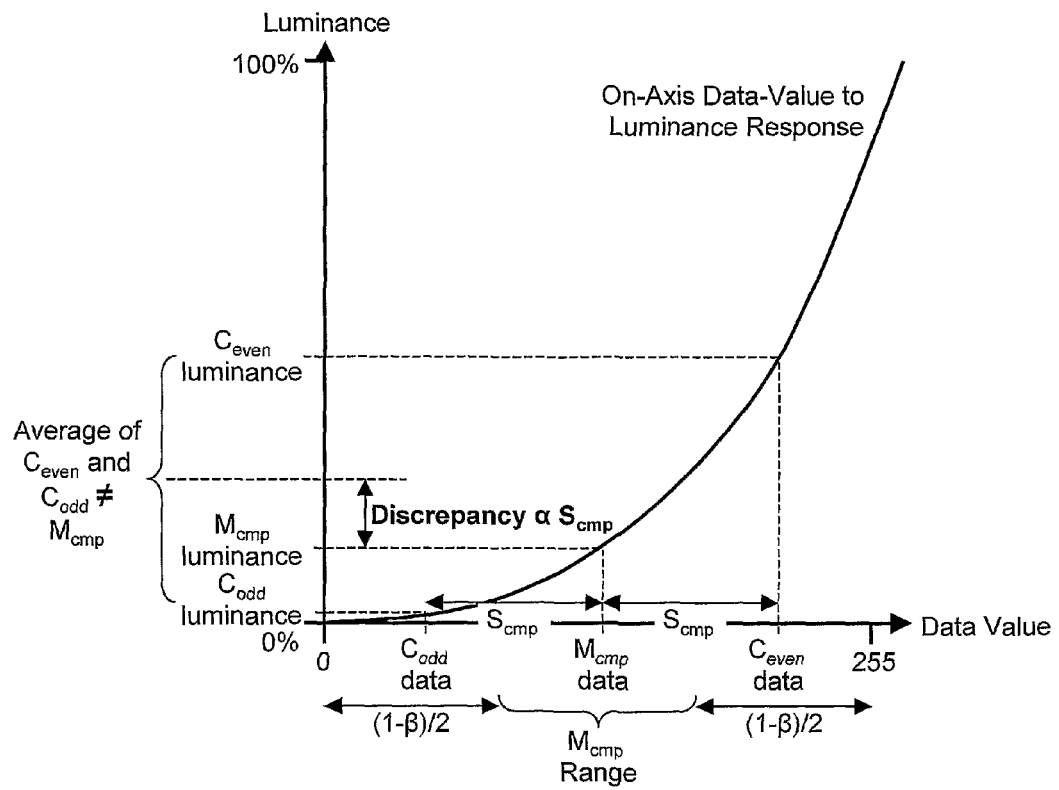
FIG. 9: is a graph illustrating the off-axis data value to luminance response and method of operation of a device in the prior art.

For the off-axis viewers however, the data-value to luminance response of the display will differ from the linear on-axis response. In this case, although the data values of neighbouring pixels in the combined image still average to the same average data value of the corresponding pixels in the compressed main image, the observed luminances will not average to the same value. The average luminance of any given pair of pixels will now vary with the data values of the corresponding pixel pair in the secondary image. The discrepancy between the average luminance of the pixel pair in the combined image, and in the compressed main image, is proportional to the secondary image data values for that pixel pair. For this reason, the off-axis viewers perceive the secondary image to be obscuring the main image. This effect is illustrated in FIG. 9.

However, it can be seen that in order to generate a strong privacy effect, the contrast of the secondary image as perceived by an off-axis viewer should be as large as possible. This depends on having a large discrepancy between the average luminance of a pixel pair in the combined image, and in the compressed main image, for image regions where the secondary image has high data values. This discrepancy can be maximized by having a large main image compression factor, β, and therefore large maximum value of $S_{cmp}$. A large β factor, though, results in a heavily compressed, and therefore degraded, main image, which is undesirable. Production of an effective privacy mode with the method as described in GB2428152A1, without excessively compromising the main image quality, therefore relies on a strongly non-linear off-axis data-value to luminance response.

Figure 10:
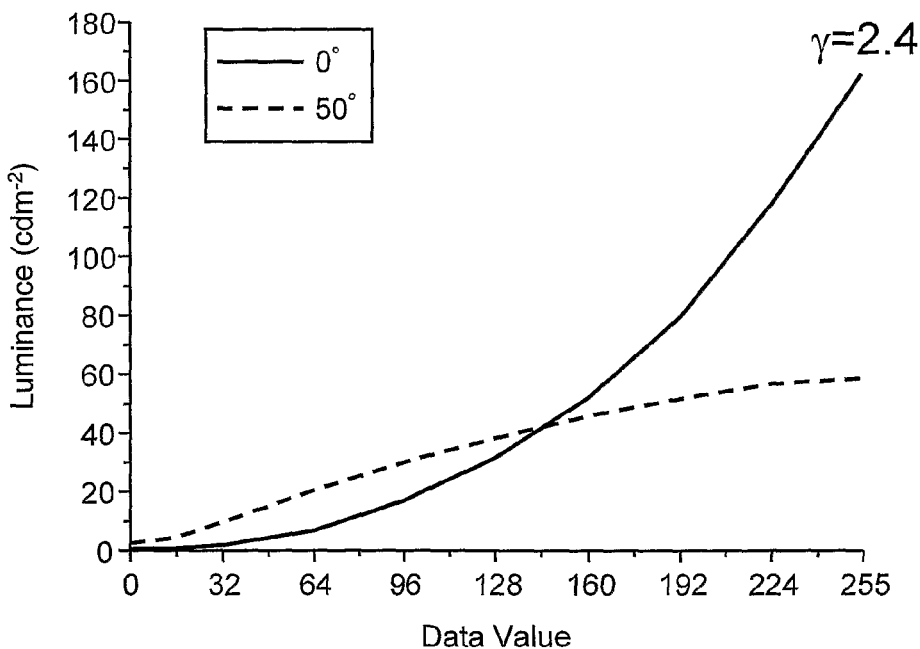
FIG. 10: is a graph showing the measured on and off-axis data value to luminance response of an LCD display of the Advanced Super View (ASV) Liquid Crystal mode.

The measured data value to luminance response of a mobile phone display, with ASV mode LC panel, is shown in FIG. 10. As can be seen, the on-axis response is not linear. If the grey level value and luminance response are normalised to have values between 0 and 1, the response approximates a power law, with luminance, L dependent on the data value D to some power, $\gamma$: $L=D^\gamma$. In the case of the display of the figure, $\gamma \approx 2.4$. In this case, adding and subtracting equal data values to/from adjacent pixels in the compressed main image will not yield an average luminance value equal to the average luminance of the same pixels in the compressed main image, even for the on axis viewer, so a degraded image will be observed. In order to preserve the image quality to the on-axis viewer, equal luminance must be added and subtracted, not equal data.

Figure 11:
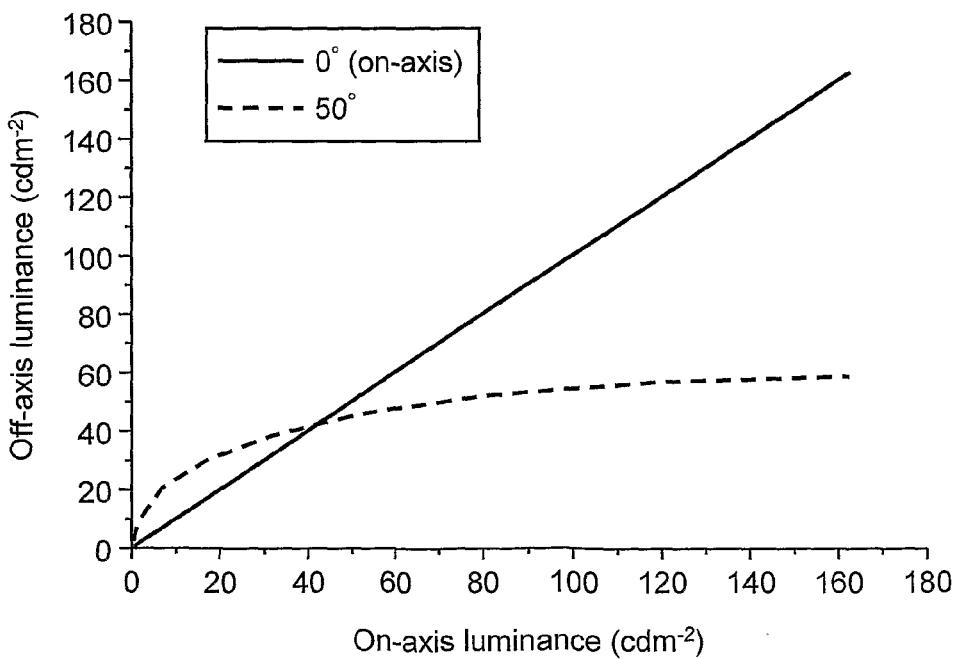
FIG. 11: is a graph of the data shown in FIG. 10, adjusted to show the on and off axis luminance as a function of the on-axis luminance for all data values.

If the on and off-axis luminances are plotted as a function of on-axis luminance (on-axis luminance then being a straight line, plotted against itself) as in FIG. 11, it can be seen that the degree of curvature of the off-axis vs. on-axis luminance determines the strength of the privacy effect as before. As seen in the figure, in an ASV display, this curvature is not large, especially above 50% brightness, so a straightforward compression of the main and secondary images, before alternate addition/subtraction combination, as described in GB2428152A1, will not yield a satisfactory privacy effect. This problem is exacerbated in the instance where the main image is largely white, and therefore will have compressed values in the linear, high luminance region of the off-axis-to-on-axis luminance curve.

In order, therefore, to optimise the privacy effect for an LCD display with non-linear on-axis data value to luminance curve, as the solid line in FIG. 10, and also a weakly non-linear off-axis to on-axis luminance curve, as the dashed line in FIG. 11, an improved method of determining the relationship between the input image pixel data and resultant image pixel luminances as displayed on the LC panel, is now detailed:

In a preferred embodiment, both the main and secondary images have their pixel data values converted to equivalent luminance values in dependence upon a property of the display panel. For example, where the property is the display's gamma, the conversions for the main and secondary images can be expressed respectively as $M_{Lum}(x,y,c)=M_{in}(x,y,c)^\gamma$ and $S_{Lum}(x,y,c)=S_{in}(x,y,c)^\gamma$.

In a second step, these luminance values of the main image are transformed, preferably asymmetrically, in order to allow contrast or brightness of the main image to be preserved. For example, the luminance values of the main image in a preferred embodiment are compressed by a factor β and raised by an offset factor $\delta$: $M_{cmp}(x,y,c)=\beta \cdot M_{Lum}(x,y,c)+\delta$. Each pixel luminance value in the side image is then transformed by scaling by a factor equal to the difference between the luminance value of the corresponding pixel in the compressed main image and the edge of the range (0 or 1, whichever is closer). This difference can be obtained for any luminance value from the r.m.s. of the difference between the value and the centre of the range. Therefore the side image luminance values are scaled as $$S_{cmp}(x, y, c) = S_{Lum}(x, y, c) \cdot \left(0.5 - \sqrt{(M_{cmp}(x, y, c) - 0.5)^2}\right).$$

A minimum value greater than zero may be specified for the transformed equivalent luminance value for the side data value.

In the above, $\sqrt{(M_{cmp}(x,y,c)-0.5)^2}$ is equivalent to $|M_{cmp}(x,y,c)-0.5|$, which is the absolute amount by which $M_{cmp}(x,y,c)$ differs from 0.5.

Therefore, assuming that $S_{Lum}(x,y,c)$ is set to 1, then:
when $M_{cmp}(x,y,c)>0.5$ then the two values for $M_{cmp}(x,y,c) \pm S_{cmp}(x,y,c)$ are 1 and $2M_{cmp}(x,y,c)-1$.
when $M_{cmp}(x,y,c)<0.5$ then the two values for $M_{cmp}(x,y,c) \pm S_{cmp}(x,y,c)$ are $2M_{cmp}(x,y,c)$ and 0.

It is therefore apparent that, with this scheme, the addition and subtraction of $S_{cmp}(x,y,c)$ to/from $M_{cmp}(x,y,c)$ will always result in either a maximum value or a minimum value (1 or 0), at least when $S_{Lum}(x,y,c)$ is set to 1.

In a third step, the compressed main and side images are combined, now with the addition/subtraction of luminance patterned on a sub-pixel level (the choice between addition and subtraction being made in dependence upon the spatial data value). Colour sub-pixels are grouped into pairs with one pixel in each having its output luminance equal to the sum of the compressed main and side image luminances at that pixel, and the other having an output luminance equal to the compressed main image luminance minus the compressed side image luminance.

Where the off-axis to on-axis relationship has a first section which is more non-linear than a second section, the amount of luminance change introduced by the secondary data value can be determined so as to be greater where the equivalent luminance value for an image data value lies in the second section than where the equivalent luminance value lies in the first section.

As there are three colour sub-pixels in each white pixel, in order to retain the overall colour balance of the output image, the colour sub-pixels which have luminance added in the output image and those which have luminance subtracted are alternated every white pixel. This is done in both the x and y directions. It is found that this results in the optimum quality of the output image, as perceived by the on-axis viewer. The repeating unit in the pattern of combination of this method is therefore a 2×2 block of white pixels, each colour sub-pixel of which has luminance as follows:

$$C(x,y,R)=M_{cmp}(x,y,R)+S_{cmp}(x,y,R),$$

$$C(x,y,G)=M_{cmp}(x,y,G)-S_{cmp}(x,y,G)$$

$$C(x,y,B)=M_{cmp}(x,y,B)+S_{cmp}(x,y,B)$$

$$C(x+1,y,R)=M_{cmp}(x+1,y,R)-S_{cmp}(x+1,y,R)$$

$$C(x+1,y,G)=M_{cmp}(x+1,y,G)+S_{cmp}(x+1,y,G)$$

$$C(x+1,y,B)=M_{cmp}(x+1,y,B)-S_{cmp}(x+1,y,B)$$

$$C(x,y+1,R)=M_{cmp}(x,y+1,R)-S_{cmp}(x,y+1,R)$$

$$C(x,y+1,G)=M_{cmp}(x,y+1,G)+S_{cmp}(x,y+1,G)$$

$$C(x,y+1,B)=M_{cmp}(x,y+1,B)-S_{cmp}(x,y+1,B)$$

$$C(x+1,y+1,R)=M_{cmp}(x+1,y+1,R)+S_{cmp}(x+1,y+1,R)$$

$$C(x+1,y+1,G)=M_{cmp}(x+1,y+1,G)-S_{cmp}(x+1,y+1,G)$$

$$C(x+1,y+1,B)=M_{cmp}(x+1,y+1,B)+S_{cmp}(x+1,y+1,B)$$

The equivalent image data level for the combined image can be found by applying the inverse of the gamma power operation: $C_{data}(x,y,c)=C(x,y,c)^{1/\gamma}$. The output voltage in the expanded LUT of the display control electronics will then be equal to the voltage corresponding to this equivalent data level in the public mode off LUT entries.

This process generates the maximum possible value of $S_{cmp}$ for each pixel in the image, according to that pixel's luminance value in $M_{cmp}$. In effect, one pixel in each pair in the output image is set to have maximum or minimum luminance, whichever its value in the compressed main image is closest to, and the luminance of the other pixel is altered to exactly compensate, so that once again their average value remains the same as the average luminance of the same pixel pair in the compressed main image.

It is apparent that, because the value of $S_{cmp}$ for any colour component of any given pixel depends on the value of $M_{cmp}$ for the same pixel, then the colour components of neighbouring pixels will only have exactly equal luminance added and subtracted, and therefore an average value in the output image equal to their average value in $M_{cmp}$, if both colour components in the pair have the same value in $M_{cmp}$. Theoretically, this will lead to degradation of the main image quality for the on-axis viewer when the combined image is displayed, but in practice, it is found that for typical images as would be used, pixel values do not change sufficiently on a pixel to pixel scale to create a problem.

If the changing value of $M_{cmp}$ from pixel to pixel were to cause a noticeable problem due to resulting $S_{cmp}$ values for neighbouring pixels being unequal, a restriction may be imposed whereby for each pair of neighbouring pixels the $S_{cmp}$ values are calculated and, if unequal, the smaller of the two is selected and applied to both pixels in the generation of the combined image. This selection process would require an extra step in the logic process of the control electronics depicted in FIGS. 5 and 6, but would ensure that equal values of luminance are added and subtracted from pixels within a group in generating the combined image, thereby preserving optimum on-axis image quality.

In determining the optimal values of β and δ to use in the above process, it is desirable to both maximise the off-axis privacy strength and preserve the on-axis image quality. As discussed previously, the value of β represents a straightforward compromise between these two performance metrics. The value of δ also represents a compromise, between contrast and brightness in the compressed main image. A smaller δ preserves the black levels of $M_{cmp}$ better, improving image contrast, but a larger δ produces an overall brighter $M_{cmp}$ image.

The values of β and δ can therefore be tailored to the off-axis to on-axis luminance curve of the LC panel, to ensure that $S_{cmp}$ has the largest values for image regions where, in $M_{cmp}$, pixel luminances are in the least non-linear region of the off-axis to on-axis luminance curve. This ensures a strong privacy effect for all values of pixel luminance in $M_{cmp}$. The processing parameters can also be tailored to optimizing privacy for a particular type of image. If a strong privacy effect is required for bright images, e.g. text on a white background, then β and δ can be selected to transform white regions in the input main image to values in $M_{cmp}$ of 50% luminance, as it is these luminance values which produce the largest values of $S_{cmp}$, and therefore produce the strongest privacy effect.

For the LCD display with on-axis to off-axis luminance curve as shown in FIG. 11, it is found that processing parameters of β=0.45 and δ=0.05 produce an output image which, when viewed on the display, demonstrates strong privacy for a wide range of input main image data levels, particularly white, and high on-axis image quality. These parameters result in the input main image being compressed to have luminance values between 0.05 and 0.5. A small offset parameter δ preserves on-axis image contrast, and although it limits values of $S_{cmp}$ to 0.05 for regions of $M_{cmp}$ with minimum luminance (i.e 0.05), it is these regions where the off-axis to on-axis luminance curve of the display is most non-linear, and so the privacy effect is amplified. The combination of small values of $S_{cmp}$ for $M_{cmp}$ pixel values on the highly non-linear region of the off-axis to on-axis luminance curve, and large values of $S_{cmp}$ for values of $M_{cmp}$ on the more linear section of the curve, yields a consistent privacy effect over all main input image values. The precise values of β and δ will clearly be determined according to the application concerned, but typical values of β may be between 0.35 and 0.55, with δ typically taking a value between 0.02 and 0.08. In some cases it may be desirable for β to have a value between 0.42 and 0.5, with δ taking a value between 0.03 and 0.07. It will be appreciated, however, that values outside these ranges may also find use in other applications.

Figure 12:
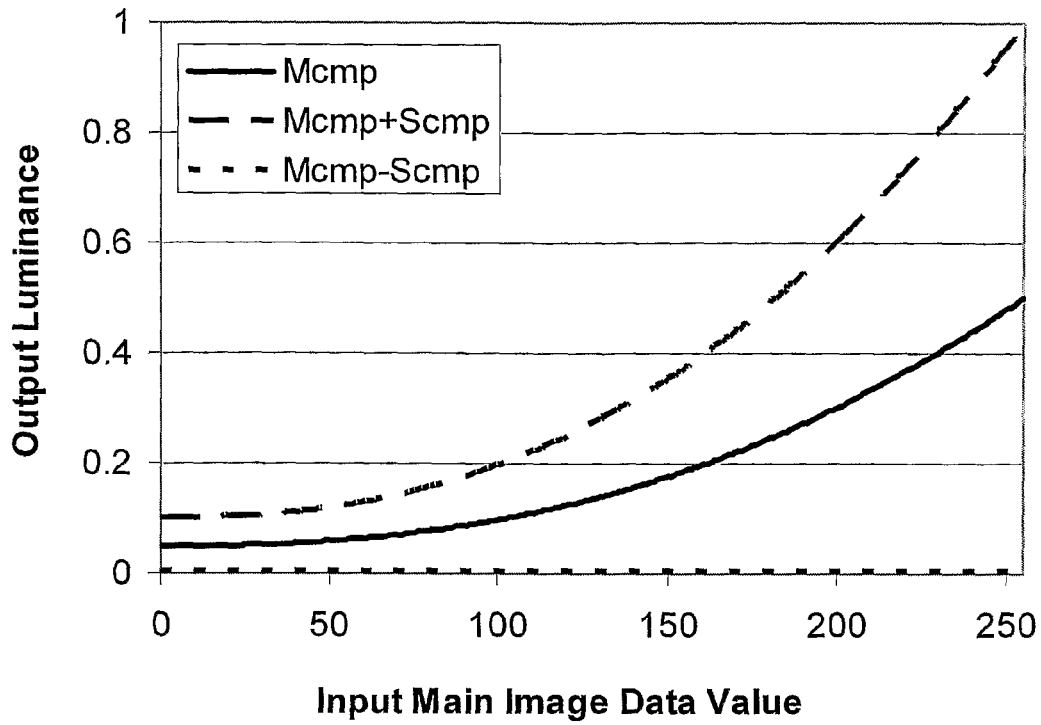
FIG. 12: is a graph showing the resulting output equivalent luminance values as a function of input image data value according a transformation relation of an embodiment of the present invention.

The luminance values of $M_{cmp}$ and $S_{cmp}$, for side image input data=1, as a function of input main image data value (display gamma=2.4), for these processing parameters, are shown in FIG. 12.

It is also the case that different processing parameters may produce optimum privacy performance for different main image contents. For example strong privacy may be achieved for an input main image which is largely white using the above parameters, whereas different parameters may produce an improved privacy effect for input main images which are largely dark. In this case, the embodiments described herein may be combined with a processing apparatus which first analyses the main image content for each frame to determine optimum processing parameters for that image, the image combining steps described here then being carried out according to those content-optimised parameters. It may also be the case that the image analysis apparatus may determine that for any input main image, different regions of the image will have the privacy effect optimised by the use of different parameters. In this case the different parameters may be applied to the different image regions for the remaining processing steps.

The processing steps described above thereby provide improved means of calculating optimal output voltage values, for all input image data levels, to yield the desired privacy effect when inserted into the expanded LUT of the first embodiment. The detailed processes described herein, and the combination of image compression and offset parameters, together with the main image dependent side image scaling, specifically to optimise the privacy effect for all input image data values in a manner tailored to the effect of the display's particular off-axis to on-axis luminance curve, is not taught or suggested in GB2428152A1.

The processing methods described above provide an improved means of generating a privacy effect, based on two input images, for an LCD display with particular optical characteristics. It is clear that different LCDs with differing optical characteristics will require variations on the methods and parameters described, but that are still substantially as described in this embodiment, to yield an optimal effect. However, depending on the particular performance of the LC panel in question, and the subjective opinion of optimised performance, a number of modifications to this method could be employed to achieve the desired effect. A series of such possible modifications, and their effect on the input image data to output displayed appearance are now detailed below. Any of these additional methods could be employed, to greater or lesser extent, in combination with the above processing steps, or each other, to yield the desired privacy effect.

In the first additional method, the LC panel for use with the privacy effect may have a measurably different data-value to luminance response for each of the three colour components of the display. In this case, an improved appearance of the displayed output image can be obtained by converting the input image colour component data values to equivalent luminance values separately, using an individual gamma value each for the R, G and B input data components. i.e.

$$M_{Lum}(x,y,R) = M_{in}(x,y,c)^{\gamma red},$$

$$M_{Lum}(x,y,G) = M_{in}(x,y,c)^{\gamma green}$$

$$M_{Lum}(x,y,B) = M_{in}(x,y,c)^{\gamma blue}$$

and $$S_{Lum}(x,y,R) = S_{in}(x,y,c)^{\gamma red}$$

$$S_{Lum}(x,y,G) = S_{in}(x,y,c)^{\gamma green}$$

$$S_{Lum}(x,y,B) = S_{in}(x,y,c)^{\gamma blue}$$

The range of pixel luminance values in the $M_{cmp}$ and $S_{cmp}$ arrays are then different for the different colour components, even for greyscale images or other image regions which had equal data values for the different colour components in the input images. The LUT value generating process after this step can then continue as detailed in the preferred method embodiment. This method can be used to ensure that each pixel group, over which the luminance is made to average in the output image to the same average value as the same pixel group in the compressed main image, also has the colour detail preserved as closely as possible between the two images.

Using this method, image regions with the same input main image data can be made to have an identical appearance in the displayed output image, regardless of the value of the side image input data over that region, to the on-axis viewer, 3, as both luminance and chrominance are preserved. Changing values of the input side image data therefore have no effect on the appearance of the output image to the on-axis viewer, 3, and so the side image is effectively invisible.

This method is not limited to assigning a separate gamma value (power law parameter) to each colour component. The data-value to luminance response of each colour component on the display to be used could have any characteristic, and as long as the resulting output luminance for each input data level is known, then the appropriate transformations can be made to yield the privacy effect with invisible side image to the on-axis viewer, 3. It is also the case that, due to electrical crosstalk between adjacent pixels or colour sub-pixels or other reasons, the data-value to luminance response of the three colour components of the display, when measured in isolation, may differ from the same responses when measured simultaneously on the display. These effects can also be taken in account when determining the processing parameters in order to yield the privacy effect with invisible side image to the on-axis viewer, 3.

In the second additional method, the invisibility of the side image, 8, to the on-axis viewer, 3, is reduced by ensuring that, while the $S_{cmp}$ pixel values are maximised based on the corresponding pixels' values in the compressed main image, a minimum, non zero value for all pixels in $S_{cmp}$ is stipulated, so that the variation in values of Scmp due to variation in the input side image, 8, is reduced. This ensures that there is at least some variation in luminance between neighbouring pixels in all averaging groups, even regions of the image where the input side image values are zero.

Figure 13:
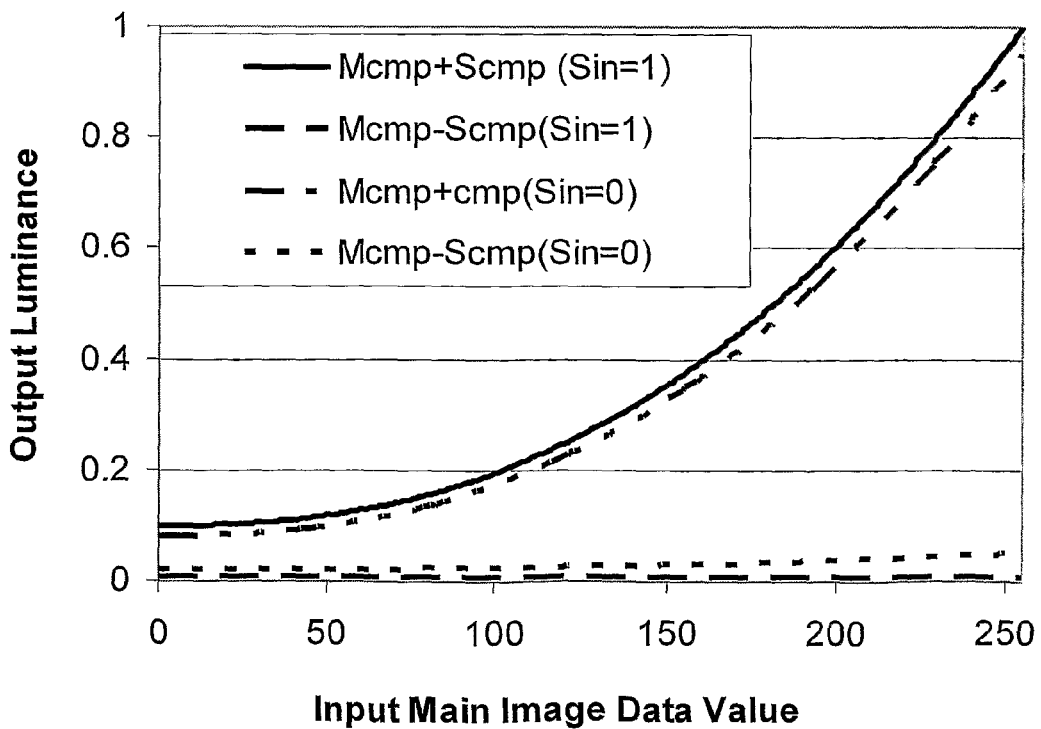
FIG. 13: is a graph showing the resulting output equivalent luminance values as a function of input image data value according a transformation relation of a further embodiment of the present invention.

One method of calculating the output image pixel values to achieve this effect is to generate two sets of compressed main image values, one for regions where the input side image data value equals zero, and one for regions where it equals one. If the processing parameters, β, δ are set at 0.45 and 0.05 respectively for the $S_{in}=1$ image, and are set at 0.42 and 0.03 for the $S_{in}=0$ image, then after processing the input images and combining as described in the preferred process embodiment, the output image luminances are as shown in FIG. 13. It can be seen from the figure that the luminance difference to the on-axis viewer of regions with the same main input image, 7, data value, but different side input image, 8, data value is greatly reduced in comparison to the preferred embodiment whose relative values are displayed in FIG. 12. This results in much reduced visibility of the side image to the on-axis viewer, 3, but also some reduction in the privacy strength as perceived by the side viewers, 4. Again, the parameters β and δ used for both the $S_{in}=0$ and $S_{in}=1$ regions can be adjusted to affect the degree of compromise between these two metrics.

Figure 14:
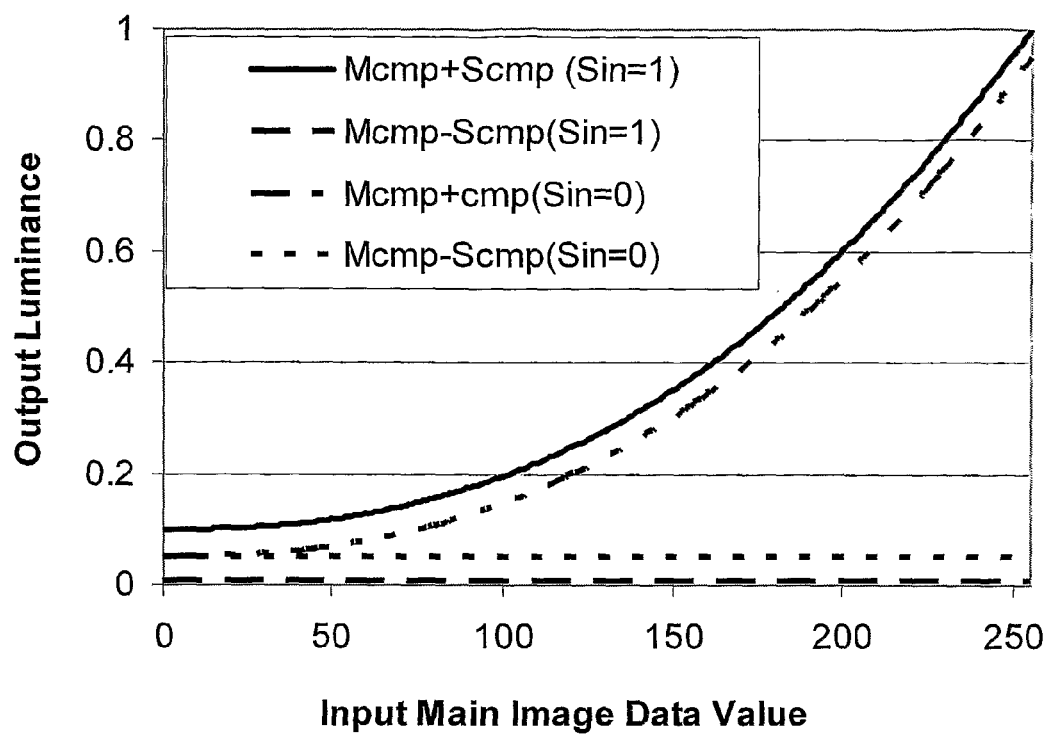
FIG. 14: is a graph showing the resulting output equivalent luminance values as a function of input image data value according a transformation relation of a still further embodiment of the present invention.

It is the difference between the processing parameters β and δ used for the $S_{in}=0$ and $S_{in}=1$ calculations that determines the privacy strength, and setting either β or δ to have the larger difference in the two calculations can be used to adjust the privacy strength/on-axis side image visibility compromise for different input main image values. In particular, the difference in the offset parameter δ chiefly determines the privacy strength for dark regions in $M_{cmp}$, and the difference in the compression parameter β determines the privacy strength for bright regions in $M_{cmp}$. If the processing parameters β, δ are set at 0.45 and 0.05 respectively for the $S_{in}=1$ image, and are set at 0.45 and 0 for the $S_{in}=0$ image, then there is now a larger difference in the offset parameters compared to the previous example, so a stronger privacy effect will be apparent for low main image input data level regions. The difference in $M_{cmp} \pm S_{cmp}$ values for the $S_{in}=0$ and $S_{in}=1$ states remains unchanged from the previous example (FIG. 12) for regions of input main image data level=255 however. This effect can be seen in the plot of resultant output luminances against input main image data, as shown in FIG. 14.

Figure 15A:
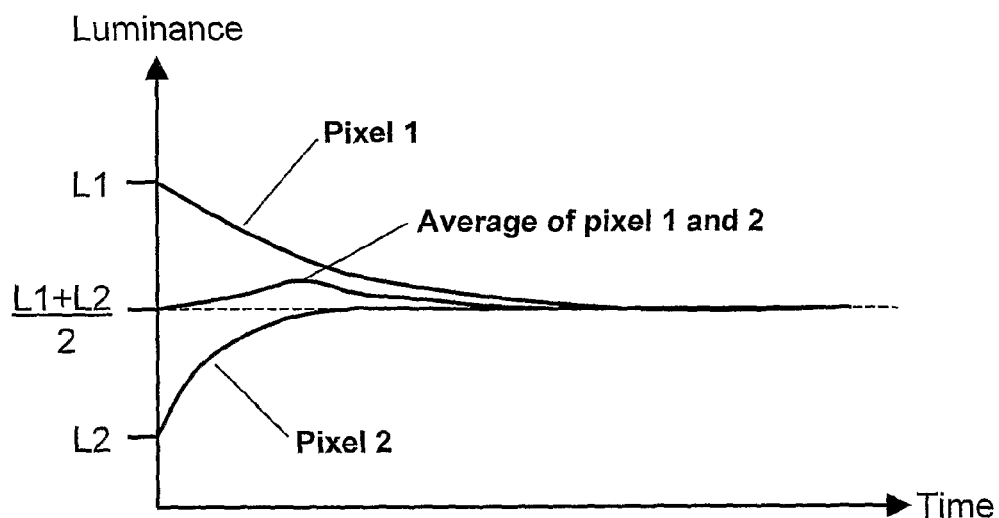
FIG. 15A: is a graph illustrating differential LC response times in two display pixels switching to their average value resulting in a transient change in their average value.

It has been found that when an LCD is used in the privacy mode as described, if the input side image changes suddenly, i.e. if an animated side image is used, then the on-axis viewer, 3, may observe undesirable "flashing" artefacts in regions of the output image where the side-image, 8, changes from zero to one, or vice versa from one frame to another. It is thought this is due to the differential switching speeds for two different pixels at different luminance values both switching to their average luminance value. Although the average luminance for the pixels is the same at the start and end of the switch, if the switching speeds are different the average value will deviate during the switch, causing a visible flash on axis. This effect is illustrated in FIG. 15A. However, it has been found that this undesirable effect can also be removed by applying the minimum $S_{cmp}$ value greater than zero method described here.

Figure 15B:
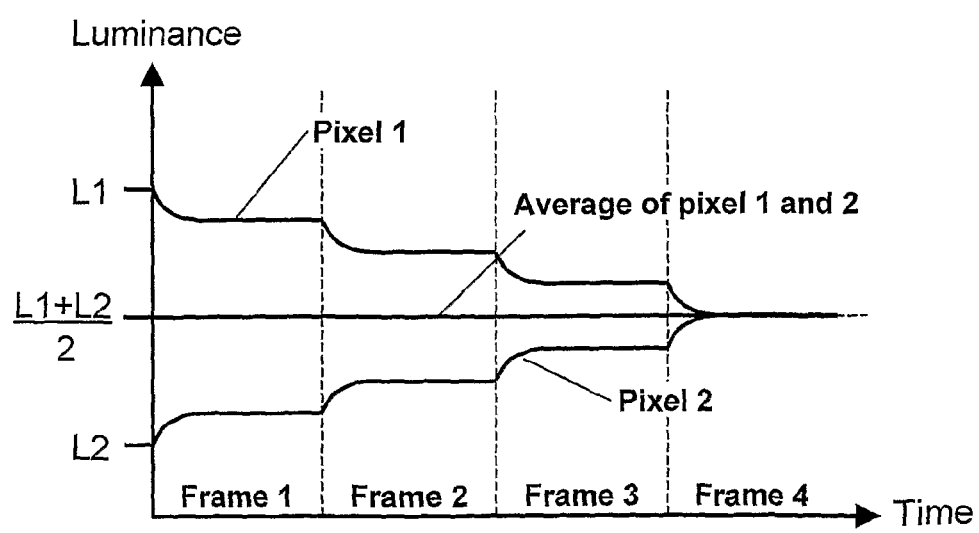
FIG. 15B: is a graph corresponding to that of FIG. 15A, showing the result of using a bit-depth of greater than one for the side image data.

An alternative method of removing this problem is to increase the bit-depth of the side image data to greater than one. This provides means for transitions of regions of the display with a side image luminance value of 1 to a side image luminance value of 0, or vice versa, to be graduated. Inserting image frames with intermediate side image luminance values between the one and zero states minimises the effect the differential switching times for pixels within a group to converge on, or diverge from, their average value has on the observed on-axis image. This situation is shown in FIG. 15B.

Another advantage of increasing the bit depth of the side image to greater than one is the capability of showing full colour side images when in the private mode. As is illustrated in FIG. 15B, a two-bit side image can be incorporated into the combined image by providing four different pairs of output luminance values for every possible value of the compressed main image, each having the same average luminance for the on-axis viewer, and each corresponding to one of the four data values of the side image in the expanded look-up table. Each pair will have a different average luminance off axis however, and therefore this can be used to produce a range of off-axis luminances for each pixel pair for any required on-axis luminance.

If the side image data consists of two-bit data per colour component, this provides 64 colours in total and an expanded LUT with four side image value entries for each compressed main image value entry is required for each of the R, G and B colour components. It has been found that increasing the bit-depth of the side image beyond 6-bit (2 bit per colour) has little effect on the appearance of the colour side image to the off-axis viewer, 4.

In order to accurately reproduce the colour side image to the off-axis viewer, 4, when displayed on the LCD, it is necessary that the different output luminance values for each on-axis average luminance correspond to approximately equal steps in perceived average luminance for the off-axis viewer, 4. If the off-axis to on-axis luminance characteristic of the LCD display used is similar to that shown in FIG. 11, then the greater the difference in the individual luminance values of a pixel pair (i.e. the greater the splitting applied to the input compressed main image pixel pair), the darker the appearance of the pixel pair to the off-axis viewer, 4.

For input side image data consisting of values of zero to three for each RGB component, zero splitting, i.e. output pixel values equal to the compressed main image input values, may be applied for regions of the combined image corresponding to regions of the side image, 8, having data values of 3, and maximal splitting, whereby one of the pixel pair is set to have a luminance of zero or one, and the other is adjusted to preserve the same average luminance as the equivalent pair in the compressed main image as described in the preferred embodiment, may be applied for regions of the combined image corresponding to regions of the side image, 8, having data values of 0. This will provide the appearance of the side image to the off-axis viewer, 4 with maximum contrast.

Output pixel pair luminance values for regions of the combined image corresponding to regions of the side image with data values of 1 and 2 may then be determined by calculating them to have a degree of splitting between zero (output values equal to the compressed main image input values) and one (maximal splitting as described) which produces an average luminance to the off axis viewer, 4, approximately ⅓ and ⅔ of the way respectively from the 0 to 1 splitting off-axis average luminances, in luminance terms. It has been found that for an ASV mode LCD with off-to-on-axis luminance characteristics of the type shown in FIG. 11, splitting proportions of 0.98 and 0.85 for side image date values of 1 and 2 respectively produce this desired result.

In terms of the compressed main image and side image as described previously for the preferred embodiment, the output luminance values in the combined image, for each input main image data value are calculated as:

$$C(x,y,R) = M_{cmp}(x,y,R) \pm 1 \times S_{cmpmax}(x,y,R), \text{ for } S_{in}=0$$

$$C(x,y,R) = M_{cmp}(x,y,G) \pm 0.98 \times S_{cmpmax}(x,y,R), \text{ for } S_{in}=1$$

$$C(x,y,R) = M_{cmp}(x,y,B) \pm 0.85 \times S_{cmpmax}(x,y,R), \text{ for } S_{in}=2$$

$$C(x,y,R) = M_{cmp}(x,y,B) \pm 0, \text{ for } S_{in}=3$$

where "$S_{cmpmax}$" is the compressed side image value, calculated as previously for $S_{cmp}$ with an input side image data value of 1.

Figure 19:
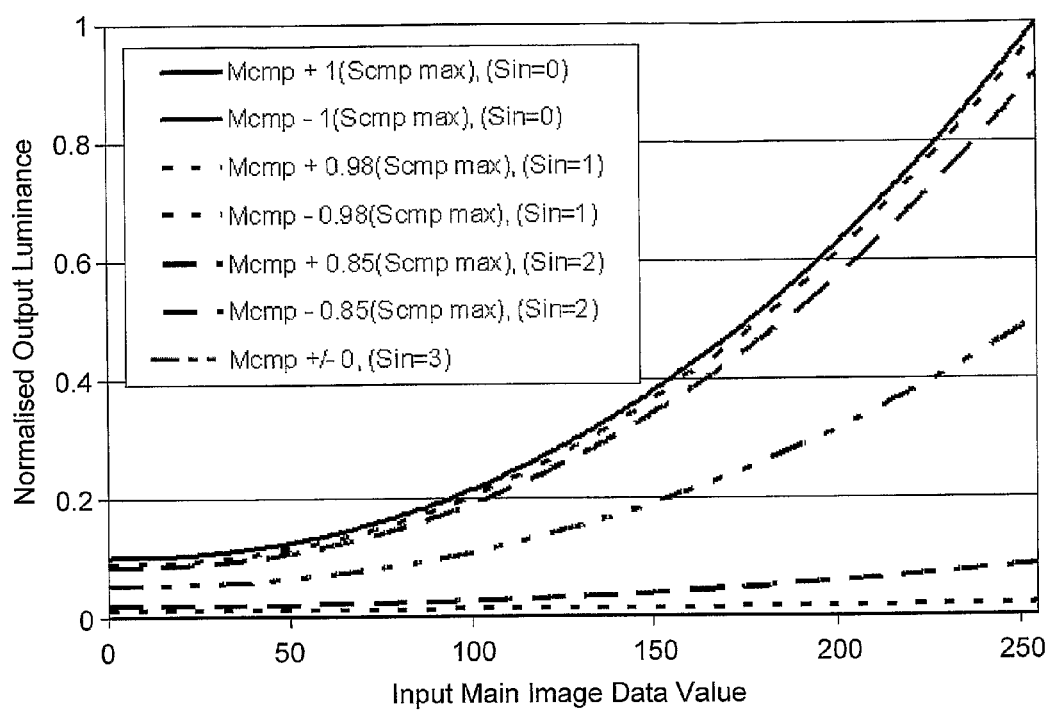
FIG. 19: is a graph showing the resulting output equivalent luminance values as a function of input image data value according to a transformation relation of a still further embodiment of the present invention.

The values of these relationships, as a function of input main image data value, using the same main image compression factors are shown in FIG. 19.

In order to display a wide range of side-image content to the off-axis viewer, 4, in the private mode, it is necessary to image datasets in common formats to have 2 bits per colour. In doing this, it is desirable to take into account the data value to luminance response of the display, so that input side images with greater colour depth have their pixels "binned" into values of 0, 1, 2 and 3 according to the luminance they would correspond to if displayed on the device in the public mode. This, combined with the chosen splitting proportions for each side image value detailed above, ensures the level of splitting applied to pixel pairs in the image combination step accurately reproduces the side image to the off-axis viewer, 4.

Although the method of populating the expanded LUT for colour side image privacy using calculations based on different fractions of the available splitting of pixel pairs as described here has been shown to provide good reproduction of the side image to the off-axis viewer, it can be seen that this is not the only method that could achieve this. For any display device, there are approximately as many sets of pixel pairs with the same average luminance as there are data gradations between that average luminance and the edge of the range. A number of these can be selected for each compressed main image value to correspond to different side image values by any method without departing from the scope of the invention.

In the third additional method, the privacy strength in the output image is enhanced by increasing the number of colour sub-pixels which have a luminance value in the compressed main image ($M_{cmp}$) in the more highly non-linear region of the on-axis to off-axis luminance curve. In the LCD of the example given in FIG. 11, this is the low-luminance, dark region as discussed. One means for increasing the number of pixels with low luminance levels would be to compress the main image by a larger value $\beta$ in the first step of the process, and then use a small offset value $\delta$, however, this will result in a very dark image for the on-axis viewer, 3.

It is found that an enhanced privacy effect can be obtained, whilst retaining a brighter, higher quality image to the on-axis viewer, 3, by selectively compressing a portion of the image colour sub-pixels, based on their spatial position, by a large factor, rather than compressing the whole image uniformly by a smaller factor. In general, where the off-axis to on-axis relationship has a first section which is more non-linear than a second section, a first subset of the image elements are transformed in a first manner so that the transformed luminance range has a first degree of overlap with the first section, and a second subset of the image elements are transformed in a second manner, different to the first manner, so that the transformed luminance range has a second degree of overlap with the first section, the first degree of overlap being larger than the second degree of overlap. Essentially, the above-mentioned parameter $\beta$ is replaced by $x \cdot \beta$, where x takes a first value for those image data values of the first subset, and a second value, different from the first value, for those image data values of the second subset. The first value may be lower than the second value, such as 0.1 and 1 for the first and second values respectively.

As an example, the first main image compression step described above may be changed from a straightforward uniform compression, $M_{cmp}(x,y,c)=\beta \cdot M_{Lum}(x,y,c)+\partial$, as in the preferred value calculation embodiment to:

$$M_{cmp}(x,y,R)=\chi \cdot \beta \cdot M_{Lum}(x,y,R)+\partial$$

$$M_{cmp}(x,y,G)=\beta \cdot M_{Lum}(x,y,G)+\partial$$

$$M_{cmp}(x,y,B)=\beta \cdot M_{Lum}(x,y,B)+\partial$$

$$M_{cmp}(x+1,y,R)=\beta \cdot M_{Lum}(x+1,y,R)+\partial$$

$$M_{cmp}(x+1,y,G)=\chi \cdot \beta M_{Lum}(x+1,y,G)+\partial$$

$$M_{cmp}(x+1,y,B)=\beta \cdot M_{Lum}(x+1,y,B)+\partial$$

$$M_{cmp}(x+2,y,R)=\beta \cdot M_{Lum}(x+1,y,R)\pm\partial$$

$$M_{cmp}(x+2,y,R)=\beta \cdot M_{Lum}(x+2,y,R)+\partial$$

$$M_{cmp}(x+2,y,R)=\chi \cdot M_{Lum}(x+2,y,R)+\partial$$

where the extra compression value $\chi$ (applied to the first subset of image elements) can have any value between 0 and 1, typically 0.1. This pattern of rotating which colour sub-pixel within each pixel the extra compression is applied to is repeated across the whole image, and may be varied in the y direction also in order to further improve the resultant image quality as perceived by the on-axis viewer, 3. It also may be that two of the three sub-pixels in each pixel have the extra compression applied, or that it is applied to all three colour sub-pixels, but to only one or two pixels in every three. The scale of the compression and the spatial pattern by which it is applied to the image are not restricted to the examples provided in this embodiment, and the particular implementation used with any given LCD will depend on the particular response produced by that LCD and the subjective assessment of which provides the optimal effect. For instance, the extra compression factor could be applied to the blue sub-pixels only, utilising the eye's inferior ability to resolve fine features of this colour to reduce the apparent loss in main image resolution to the on axis viewer, 3, at the expense of come colouration. The essence of this embodiment is simply that strong compression of the luminance of a selection of image pixels can yield a stronger privacy performance, while retaining higher image brightness, than uniformly compressing by a lesser amount.

In a fourth additional method, the privacy strength in the output image is again enhanced by increasing the number of pixels which have a luminance value in the more highly non-linear region of the on-axis to off-axis luminance curve, by varying the spatial pattern by which the compressed side image luminance values are added to and subtracted from the compressed main image luminance values in the image combination step. As previously discussed, in the measured on-axis to off-axis luminance curve given in FIG. 11, the low luminance region of the curve is most non-linear, so image regions with luminance values at this end of the range are provided with a stronger privacy effect.

Rather than adding the compressed side image luminance value $S_{cmp}$ to the compressed main image luminance value $M_{cmp}$ for one pixel or colour sub-pixel in a pair, and subtracting it for the other in the image combination step, it may be the case that more pixels can be produced with low-luminance values in the output image if $S_{cmp}$ is added to two out of three pixels or sub-pixels in a group, and double the value of $S_{cmp}$ is subtracted from the third. In this way, the average luminance of the group of pixels is still made to equal the average of the same group in $M_{cmp}$, as the net value of $S_{cmp}$ within the group is still zero (assuming a constant value of $S_{in}$ over the same pixel group), but it is ensured that at least one pixel of the group has low luminance.

In general, this involves subtracting a first multiple of the transformed equivalent luminance value for the side data value for a first subset of image elements, and adding a second multiple of the transformed equivalent luminance value for the side data value for a second subset of image elements, the number of image elements in the second subset being N times that in the first subset, and the first multiple being N times the second multiple. In one particular example, the image combination step becomes:

$$C(x,y,R)=M_{cmp}(x,y,R)-2*S_{cmp}(x,y,R)$$

$$C(x,y,G)=M_{cmp}(x,y,B)+S_{cmp}(x,y,G)$$

$$C(x,y,B)=M_{cmp}(x,y,B)+S_{cmp}(x,y,B)$$

$$C(x+1,y,R)=M_{cmp}(x+1,y,R)+S_{cmp}(x+1,y,R)$$

$$C(x+1,y,G)=M_{cmp}(x+1,y,G)-2*S_{cmp}(x+1,y,G)$$

$$C(x+1,y,R)=M_{cmp}(x+1,y,R)+S_{cmp}(x+1,y,R)$$

$$C(x+2,y,R)=M_{cmp}(x+2,y,R)+S_{cmp}(x+2,y,R)$$

$$C(x+2,y,G)=M_{cmp}(x+2,y,G)+S_{cmp}(x+2,y,G)$$

$$C(x+2,y,B)=M_{cmp}(x+2,y,B)-2*S_{cmp}(x+2,y,B)$$

Figure 16:
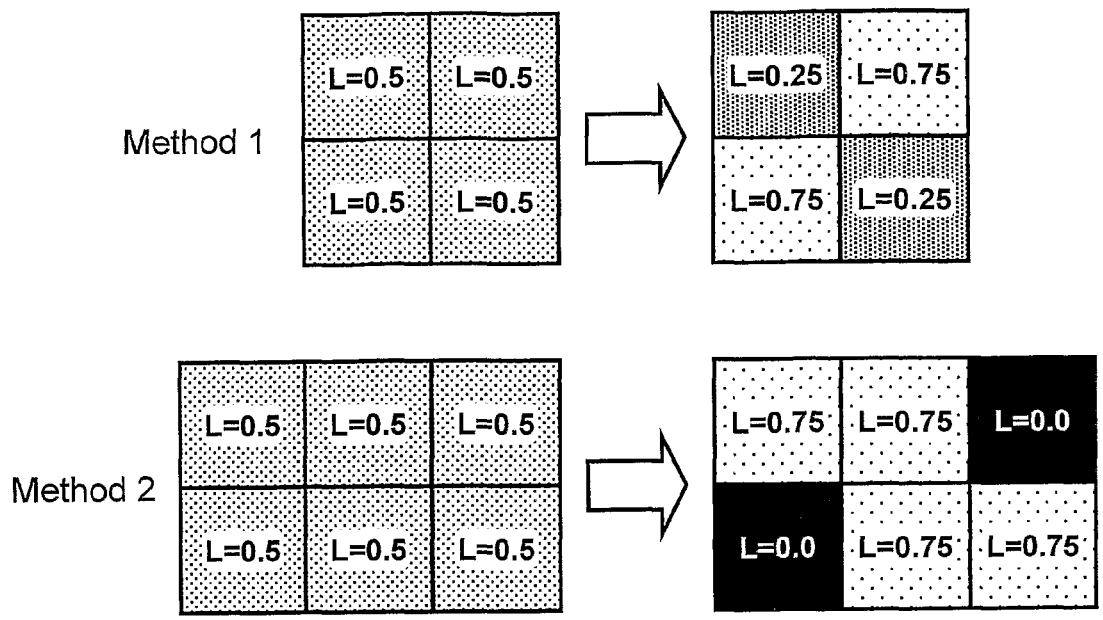
FIG. 16: is a schematic illustrating variations on the spatial patterning of transformations in equivalent pixel luminance values which maintain the same average value within a localised group, according to an embodiment of the present invention.

Once again, the rotation of which pixel or colour sub-pixel within the group has double the value of $S_{cmp}$ subtracted can be varied in the y direction also, to preserve on-axis image quality. A visual illustration of this type of expanded pixel-group combination step is shown in FIG. 16, for blocks of pixels with an $M_{cmp}$ value of 50% luminance, and an $S_{cmp}$ value of 25% luminance.

It also is the case that the number of pixels or sub-pixels in each zero net $S_{cmp}$ group may be increased to four, with the $S_{cmp}$ value added to $M_{cmp}$ in three of the four, and triple the $S_{cmp}$ value subtracted from the fourth. In fact, the number of pixels or colour sub-pixels in the group can be increased to whichever value produces the desired effect. It is the case however, that the larger the group of pixels over which the luminance is averaged to equal the average luminance of the same group in $M_{cmp}$, the less effective the eye's averaging will be, for any given viewing distance, at preserving the impression for the on-axis viewer, 3, that the observed image is substantially the same as the $M_{cmp}$ image. It can be seen that, as the spatial patterning used in the combination step is altered, to create some pixels with double or triple the $S_{cmp}$, value subtracted, the compression factors used in the $M_{in} \rightarrow M_{cmp}$ and $S_{in} \rightarrow S_{cmp}$ steps will require adjustment, to ensure all pixels have in the combined image have values in the allowed luminance range.

As is mentioned above, it is the case that in order to have a net value of $S_{cmp}$ equal to zero for each group of pixels or colour sub-pixels in the image combining step, it is necessary that the value of $S_{in}$ remains constant over the area of each group. For example, if $S_{in}$ changes sharply on going from pixel (x,y,R) to (x,y,G), or from (x,y,c) to (x+1,y,c), then in the image combination step detailed in the preferred calculation embodiment, the added and subtracted $S_{cmp}$ values will no longer cancel out, and the side image will become visible to the on-axis viewer. In the patent disclosure GB2428152A1, it is suggested that this problem can be mitigated by using an image processing method to blur sharp edges in the input side image.

Figure 17:
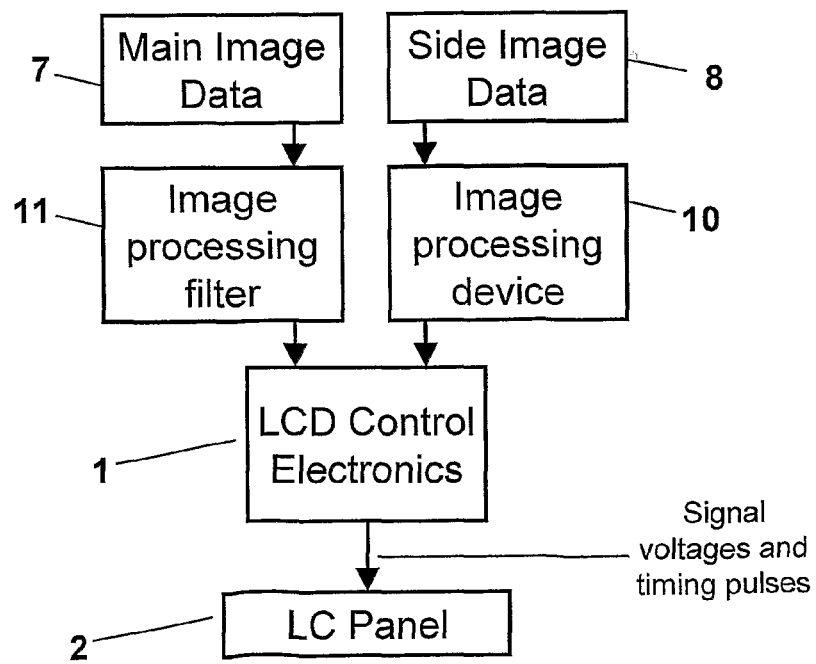
FIG. 17: is a process flow diagram illustrating the method of displaying an image dependent on two input images, according to an embodiment of the present invention.

In a fifth additional method, however, this problem is removed by ensuring that $S_{in}$ is invariant over each block of pixels or colour sub-pixels which are required to have net zero $S_{cmp}$ values in the image combination step. If the size of the pixel group over which this is required is a 2×2 block of pixels, as in the preferred calculation embodiment above, this may be achieved by shrinking the size of the input side image to ¼ of the display resolution (X/2 by Y/2 pixels, where the display comprises an X by Y pixel array), using whatever image processing technique is available to best preserve the image quality, and then re-expanding the image to full resolution using a simple nearest-neighbour interpolation method. This ensures that the full resolution side image is composed of 2×2 pixel blocks of identical data value, so all 2×2 pixel blocks will have a net zero $S_{cmp}$ value in the image combination step. An image processing device, 10, would be included in the display control electronics to perform this step on the input side image, 8, before outputting the resulting, filtered image to the LUT as described previously. This is illustrated in FIG. 17.

It can be seen that, for whatever size and shape pixel group is used as the repeating block in the image combination step, the side image can be shrunk to some fraction of the display resolution and then re-expanded using nearest neighbour interpolation to ensure that the side image is essentially composed of blocks of equal size and shape. In this way, sharp edges in the input side image, 8, are preserved, which enhances the perceived contrast of the side image observed by the off-axis viewers, 4.

It is also the case that using the compression and combination processes and parameters as described in the preferred calculation embodiment to produce the privacy effect, small colour artefacts can become apparent to the on-axis viewer, 3, for regions in the input main image which consist of single pixel width lines. This is due to the fact that the process results in an output image in which alternate colour sub-pixels are set to black, so a single pixel width black diagonal line superimposed on this pattern may leave a line of pixels either side with only one or two colour sub-pixels on, all along it's length. In this case, the coloured line becomes visible to the eye.

In a sixth additional method, these colour artefacts are removed by applying an image processing filter to the input main image, 7, which effectively slightly blurs any narrow width line features in the image (in general, blur would be added preferentially to any higher frequency image features, one example of such features being lines). An image processing filter (or filter circuitry), 11, would be included in the display control electronics to perform this step on the input main image, 7, before outputting the resulting, filtered image to the LUT as described previously. This is illustrated in FIG. 17. A method for achieving removal of colour artefacts due to this problem, with minimal blurring of the fine features of the image, is disclosed in UK patent application no. 0701325.3.

It can be seen that the methods above provide means for calculating the required output image pixel luminances, based on the input images provided, to produce the desired privacy effect in LCDs. They are essentially a means of populating the additional regions of the required LUT, as shown in FIG. 4, in a manner that optimises the effect and produces values tailored to the inherent electro-optical properties of the LC panel. As such, any combination of the techniques described and processing parameter values may be utilised which produces LUT values which give the desired effect. Similar relationships to produce the same effect would therefore fall under the scope of the invention. It is also the case that, if required, rather than using these relationships to populate an expanded LUT, the calculations could be performed by an additional computational processor in the display control electronics, on a frame-by-frame basis.

In a seventh additional embodiment, rather than inputting a side image dataset, 8, to the LCD control electronics, 1, the input main image data is analysed by an additional processing apparatus and an optimised side image is calculated to maximise the privacy effect according to the main image content. Methods of generating optimised image obscuring patterns, according to factors of the main image such as dominant spatial frequencies are described in US20080088935A1.

While the display control electronics modifications and LUT value calculations described above allow an enhanced privacy effect in displays without any alteration to the LC panel, or to the normal range of voltage signals applied to the panel from the control electronics, other modifications can be made to increase the nonlinearity of the off-axis to on-axis luminance curve and therefore enhance the effect.

Figure 18:
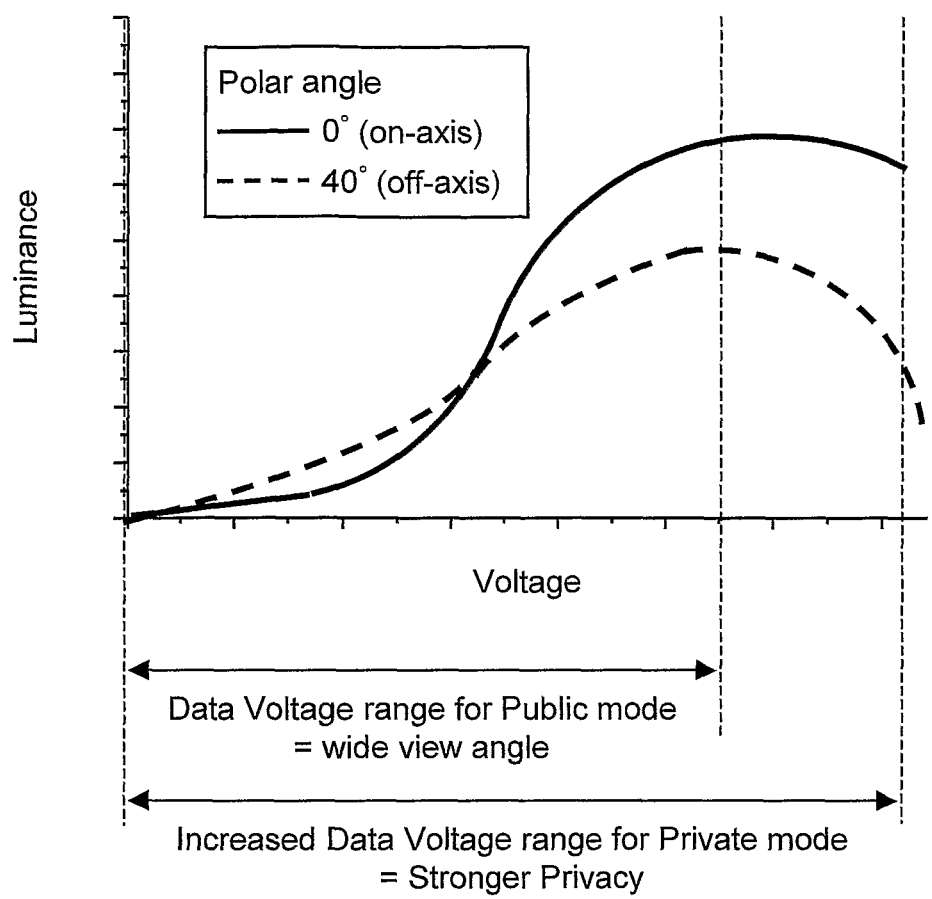
FIG. 18: is a graph illustrating the increase in nonlinearity of the off-axis to on-axis luminance curve of an LCD that may be obtained by expanding the normal range of operating pixel voltages used, according to an embodiment of the present invention.

One such modification may be to operate the LC panel with a greater range of pixel voltage in the private mode, than in the normal public mode. If an LC panel is "overdriven" in this manner, than the display luminance, as observed by the on-axis viewer, levels out and perhaps starts to decrease as the pixel voltage is increased beyond the normal range. This is due to the effective birefringence of the LC layer reaching, and then exceeding the half-waveplate condition. To the off-axis viewer, due to off-axis rays travelling a greater distance within the LC layer, this effect will be further exaggerated, resulting in greater non-linearity in the off-axis to on-axis luminance curve. This effect is illustrated in FIG. 18, and can be utilised to provide a stronger privacy effect for high brightness regions of the image. This effect may be exaggerated still further by increasing the thickness of the LC layer, or the birefringence of the LC material used, in the display beyond the minimum required to achieve the half-waveplate condition at high voltage.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A display device comprising a liquid crystal display panel for displaying an image by spatial light modulation, the image being represented by a plurality of image elements each having an image data value, and the display device further comprising a display controller arranged to determine a signal voltage to be applied to the panel for each image element in dependence upon its image data value and a secondary data value for the element, there being a predetermined mapping between the data values and the signal voltage, the secondary data values being arranged to vary across the image so as to introduce variations in luminance as a result of the mapping, the mapping and secondary data values being mutually arranged to take account of the signal voltage to on-axis luminance response of the panel so that the luminance variations introduced on-axis tend to balance locally through spatial averaging to, and hence would not be perceivable by, an on-axis viewer, the panel furthermore having a non-linear off-axis luminance to on-axis luminance relationship, so that at least some of the luminance variations introduced off-axis do not balance locally through spatial averaging to, and hence would be perceivable by, an off-axis viewer, wherein each secondary value comprises a side data value and a spatial data value, the spatial data value controlling at least in part whether a luminance increase or decrease is introduced by the secondary data value and the side data value controlling at least in part an amount of the luminance increase or decrease, and the display controller comprises mapping circuitry having respective inputs for receiving the image data value and the secondary data value for an image element of the plurality, circuitry for looking up a stored value in dependence upon the input data values, and an output for outputting the stored value, the signal voltage for the image element being determined in dependence upon the output value.

2. A display device as claimed in, claim 1 wherein the mapping and secondary data values are mutually arranged such that, for each of a plurality of groups of image elements perceived by a viewer as having a single luminance through spatial averaging, any increase in luminance introduced by the secondary data value or values of one subset of elements in the group is substantially matched by a substantially equal decrease in luminance introduced by the secondary data value or values of another subset of elements in the group, at least where the respective image data values of the elements in the subsets are equal.

3. A display device as claimed in claim 2, wherein at least some of the groups comprise a pair of image elements, the secondary data value for one of the image elements of the pair being arranged to introduce an increase in luminance of an amount, and the secondary data value for the other image element of the pair being arranged to introduce a decrease in luminance by substantially the same amount, at least where the respective image data values of the two image elements of the pair are equal.

4. A display device as claimed in claim 3, wherein the luminance change introduced by the secondary data value is determined such that either the resulting luminance of one of the image elements of the pair is close to a maximum luminance or the resulting luminance of the other image element of the pair is close to a minimum luminance.

5. A display device as claimed in claim 1, wherein the on-axis luminance response of the display panel is non-linear with respect to variations in the image data value.

6. A display device as claimed in claim 1, wherein the side data values together form a distracting side image that is perceived by the off-axis viewer.

7. A display device as claimed in claim 6, comprising means to reduce the resolution of the side image, so as to introduce localised blocks having side data values of equal value.

8. A display device as claimed in claim 1, wherein the mapping incorporates a conversion of the image and side data values to equivalent respective luminance values in dependence upon a property of the display panel.

9. A display device as claimed in claim 8, wherein the property comprises a gamma value $\gamma$ associated with the display panel, and wherein the equivalent luminance value $M_{Lum}$ of an image data value $M_{in}$ is calculated as $M_{Lum}=M_{in}^{\gamma}$ and the equivalent luminance value $S_{Lum}$ of a side data value $S_{in}$ is calculated as $S_{Lum}=S_{in}^{\gamma}$, with each of $M_{Lum}$, $M_{in}$, $S_{Lum}$ and $S_{in}$ being represented on a scale from 0 to 1.

10. A display device as claimed in claim 8, wherein the mapping incorporates a transformation of the equivalent luminance value for the image data value.

11. A display device as claimed in claim 10, wherein the transformation is asymmetric.

12. A display device as claimed in claim 11, wherein the transformation comprises a scaling and translation of the form $M_{cmp}=\beta \cdot M_{Lum}+\delta$, where $\beta$ and $\delta$ are predetermined respective scaling and translation parameters, $M_{Lum}$ is the equivalent luminance value for the image data value and $M_{cmp}$ is the scaled and translated value for the image data value, with $M_{Lum}$ and $M_{cmp}$ being represented on a scale from 0 to 1.

13. A display device as claimed in claim 12, wherein $\beta$ is a value between 0.35 and 0.55, and $\delta$ is a value between 0.02 and 0.08.

14. A display device as claimed in claim 13, wherein $\beta$ is a value between 0.42 and 0.5, and $\delta$ is a value between 0.03 and 0.07.

15. A display device as claimed claim 10, wherein the transformation is dependent upon the side data value.

16. A display device as claimed in claim 10, wherein the transformation is asymmetric, the transformation comprises a scaling and translation of the form $M_{cmp}=\beta \cdot M_{Lum}+\delta$, where $\beta$ and $\delta$ are predetermined respective scaling and translation parameters, $M_{Lum}$ is the equivalent luminance value for the image data value and $M_{cmp}$ is the scaled and translated value for the image data value, with $M_{Lum}$ and $M_{cmp}$ being represented on a scale from 0 to 1, and wherein different values for $\beta$ and $\delta$ are used depending on the side data value.

17. A display device as claimed in claim 10, wherein the off-axis to on-axis relationship has a first section which is more non-linear than a second section, and wherein a first subset of the image elements are transformed in a first manner so that the transformed luminance range has a first degree of overlap with the first section, and a second subset of the image elements are transformed in a second manner, different to the first manner, so that the transformed luminance range has a second degree of overlap with the first section, the first degree of overlap being larger than the second degree of overlap.

18. A display device as claimed in claim 12, wherein the off-axis to on-axis relationship has a first section which is more non-linear than a second section, and wherein a first subset of the image elements are transformed in a first manner so that the transformed luminance range has a first degree of overlap with the first section, and a second subset of the image elements are transformed in a second manner, different to the first manner, so that the transformed luminance range has a second degree of overlap with the first section, the first degree of overlap being larger than the second degree of overlap; and
wherein $\beta$ is replaced by $\chi \cdot \beta$, and where $\chi$ takes a first value for those image data values of the first subset, and a second value, different from the first value, for those image data values of the second subset.

19. A display device as claimed in claim 18, wherein the first value is lower than the second value, such as 0.1 and 1 for the first and second values respectively.

20. A display device as claimed in claim 10, wherein the mapping incorporates a transformation of the equivalent luminance value for the side data value.

21. A display device as claimed in claim 20, wherein the transformation is of the form $S_{cmp}=S_{Lum} \times (0.5-|M_{cmp}-0.5|)$, where $S_{Lum}$ is the equivalent luminance value for the side data value and $S_{cmp}$ is the transformed equivalent luminance value for the side data value, with $S_{Lum}$ and $S_{cmp}$ being represented on a scale from 0 to 1.

22. A display device as claimed in claim 20, wherein a minimum value greater than zero is specified for the transformed equivalent luminance value for the side data value.

23. A display device as claimed in claim 20, comprising adding or subtracting a multiple of the transformed equivalent luminance value for the side data value to/from the transformed equivalent luminance value for the image data value, the choice between addition and subtraction being made in dependence upon the spatial data value.

24. A display device as claimed in claim 23, wherein the multiple is 1.

25. A display device as claimed in claim 23, wherein different multiples are used for different subsets of image elements.

26. A display device as claimed in claim 25, comprising subtracting a first multiple of the transformed equivalent luminance value for the side data value for a first subset of image elements, and adding a second multiple of the transformed equivalent luminance value for the side data value for a second subset of image elements, the number of image elements in the second subset being N times that in the first subset, and the first multiple being N times the second multiple.

27. A display device as claimed in claim 8, wherein the off-axis to on-axis relationship has a first section which is more non-linear than a second section, and wherein the amount of luminance change introduced by the secondary data value is determined so as to be greater where the equivalent luminance value for an image data value lies in the second section than where the equivalent luminance value lies in the first section.

28. A display device as claimed in claim 1, comprising circuitry for determining the spatial data value from spatial information relating to the image element.

29. A display device as claimed in claim 28, wherein the spatial information comprises horizontal and vertical image coordinates associated with the image element.

30. A display device as claimed in claim 1, wherein fewer side data values are provided than there are image data values, with at least one side data value being used for a plurality of different image data values.

31. A display device as claimed in claim 1, wherein fewer spatial data values are provided than there are image data values, with at least one spatial data value being used for a plurality of different image data values.

32. A display device as claimed in claim 1, wherein fewer secondary data values are provided than there are image data values, with at least one secondary data value being used for a plurality of different image data values.

33. A display device as claimed in claim 1, comprising circuitry for filtering the image, as represented by the image data values, to add an amount of blur preferentially to any higher frequency image features such as lines.

34. A display device as claimed in claim 1, wherein the output value is used as the signal voltage.

35. A display device as claimed in claim 1, wherein the display panel comprises a plurality of pixels each having a plurality of colour components, and wherein each image element is associated with an individual such colour component.

36. A display device as claimed in claim 3, wherein the display panel comprises a plurality of pixels each having a plurality of colour components, and wherein each image element is associated with an individual such colour component, and
wherein the image elements of the pair relate respectively to the same colour component of different pixels.

37. A display device as claimed in claim 36, wherein the image elements of the pair are from horizontally or vertically adjacent pixels.

38. A display device as claimed in claim 8, wherein the display panel comprises a plurality of pixels each having a plurality of colour components, and wherein each image element is associated with an individual such colour component, and
wherein different conversions are used respectively for at least two colour components, based on different respective properties of the display panel associated with those components.

39. A display device as claimed in claim 17, wherein the display panel comprises a plurality of pixels each having a plurality of colour components, and wherein each image element is associated with an individual such colour component, and
wherein the first subset comprises image elements from different respective pixels, each image element of the first subset being associated with a different colour component.

40. A display device as claimed in claim 1, comprising means for increasing the non-linearity of the off-axis luminance to on-axis luminance relationship.

41. A display device as claimed in claim 26, wherein the display panel comprises a plurality of pixels each having a plurality of colour components, and wherein each image element is associated with an individual such colour component, and
the first subset comprises image elements from different respective pixels, each image element of the first subset being associated with a different colour component.

* * * * *